United States Patent
Morishima

(10) Patent No.: US 10,634,100 B2
(45) Date of Patent: Apr. 28, 2020

(54) CONTROL DEVICE FOR INTERNAL COMBUSTION ENGINE

(71) Applicant: TOYOTA JIDOSHA KABUSHIKI KAISHA, Toyota-shi (JP)

(72) Inventor: Akinori Morishima, Naka-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/173,014

(22) Filed: Oct. 29, 2018

(65) Prior Publication Data
US 2019/0203670 A1 Jul. 4, 2019

(30) Foreign Application Priority Data

Dec. 29, 2017 (JP) ................................ 2017-255140

(51) Int. Cl.
| | |
|---|---|
| F02B 47/08 | (2006.01) |
| F02M 26/25 | (2016.01) |
| F02M 26/05 | (2016.01) |
| F02M 26/28 | (2016.01) |
| F02M 26/33 | (2016.01) |

(Continued)

(52) U.S. Cl.
CPC ............ *F02M 26/25* (2016.02); *F02M 26/05* (2016.02); *F02M 26/06* (2016.02); *F02M 26/08* (2016.02); *F02M 26/28* (2016.02); *F02M 26/33* (2016.02); *F02D 41/005* (2013.01); *F02D 41/0072* (2013.01); *F02M 26/35* (2016.02); *F02M 26/47* (2016.02)

(58) Field of Classification Search
CPC ........ F02M 26/00; F02M 26/05; F02M 26/07; F02M 26/06; F02M 26/25; F02M 26/33; F02M 2026/004; F02D 41/005; F02D 21/08

USPC ............ 123/568.11, 568.12, 568.15, 568.21, 123/568.22, 568.23, 568.31

See application file for complete search history.

(56) References Cited

U.S. PATENT DOCUMENTS

| | | | | |
|---|---|---|---|---|
| 2010/0179745 | A1* | 7/2010 | Nakayama | .......... F02D 41/0072 701/108 |
| 2017/0335748 | A1* | 11/2017 | Zhang | .................... F02M 26/05 |

(Continued)

FOREIGN PATENT DOCUMENTS

JP  2001-041110  2/2001

*Primary Examiner* — John Kwon
(74) *Attorney, Agent, or Firm* — Oblon, McClelland, Maier & Neustadt, L.L.P.

(57) ABSTRACT

A control device controls an internal combustion engine including: an EGR cooler bypass passage; and a flow-rate-ratio control valve capable of controlling, by adjustment of its opening degree, an EGR cooler ratio R. The control device is configured, during an EGR gas introduction operation, to execute an intake air temperature control for adjusting the opening degree such that an intake air temperature Tb approaches a target intake air temperature Tbt. In this intake air temperature control, the control device is configured, when a designated condition that, even if the adjustment of the opening degree is performed, there is a temperature difference obtained by subtracting the target intake air temperature Tbt from a value of the intake air temperature Tb to be achieved as a result of the adjustment of the opening degree is met, to execute an opening-degree update prohibition processing that prohibits an update of the opening degree.

6 Claims, 11 Drawing Sheets

(51) Int. Cl.
*F02M 26/08* (2016.01)
*F02M 26/06* (2016.01)
F02D 41/00 (2006.01)
F02M 26/35 (2016.01)
F02M 26/47 (2016.01)

(56) References Cited

U.S. PATENT DOCUMENTS

2017/0335805 A1\* 11/2017 Zhang ........................ F01P 3/20
2019/0195175 A1\* 6/2019 Morishima ............ F02M 26/17

\* cited by examiner

AA: Shortage of EGR gas (supercharging delay)
BB: Full bypass line (bypass passing-through flow rate ratio 100% (R=0))
CC: Full cooling line (cooler passing-through flow rate ratio 100% (R=1))

AA: Shortage of EGR gas (supercharging delay)
BB: Full bypass line (bypass passing-through flow rate ratio 100% (R=0))
CC: Full cooling line (cooler passing-through flow rate ratio 100% (R=1))
DD: Second embodiment

CONTROL DEVICE FOR INTERNAL COMBUSTION ENGINE

CROSS-REFERENCE TO RELATED APPLICATION

This application is based on and claims the benefit of Japanese Patent Application No. 2017-255140, filed on Dec. 29, 2017, which is incorporated by reference herein in its entirety.

BACKGROUND

Technical Field

The present disclosure relates to a control device for an internal combustion engine, and more particularly to a control device for controlling an internal combustion engine that includes a flow-rate-ratio control valve for adjusting a flow rate ratio of the flow rate of a cooler passing-through gas flowing through an EGR cooler with respect to the total EGR gas flow rate.

Background Art

For example, JP 2001-041110 A discloses a control device for an internal combustion engine that includes an EGR device. This EGR device is equipped with an EGR cooler installed in an EGR passage, and an EGR cooler bypass passage that bypasses the EGR cooler. Also, in the EGR cooler bypass passage, a flow-rate-ratio control valve is installed to adjust the flow rate ratio of the flow rate of EGR gas flowing through the EGR cooler and the flow rate of EGR gas flowing through the EGR cooler bypass passage.

The control device described above is configured to execute feedback control of the opening degree of the flow-rate-ratio control valve. According to this feedback control, the opening degree of the flow-rate-ratio control valve is controlled such that the temperature of the EGR gas introduced into an intake air passage becomes equal to a target EGR gas temperature.

SUMMARY

According to the control of the flow-rate-ratio control valve disclosed in JP 2001-041110 A, the temperature of the EGR gas introduced into the intake air passage is controlled to the target EGR gas temperature, whereby intake air temperature that is the temperature of the gas suctioned into a cylinder (that is, mixed gas of fresh air and EGR gas) can be controlled.

If this kind of control of the intake air temperature is performed, there is a concern that, when the frequency of adjustment of the opening degree of the flow-rate-ratio control valve becomes higher, the wear of a moving portion of the flow-rate-ratio control valve may progress.

The present disclosure has been made to address the problem described above, and an object of the present disclosure is to provide a control device for an internal combustion engine that properly manage the opportunity of an opening degree adjustment of a flow-rate-ratio control valve and that can thus reduce the progress of wear of the flow-rate-ratio control valve.

A control device for controlling an internal combustion engine according to the present disclosure is configured to control an internal combustion engine including an EGR device that includes:

an EGR passage configured to connect an intake air passage of the internal combustion engine with an exhaust gas passage thereof;
an EGR cooler arranged at the EGR passage;
an EGR cooler bypass passage configured to be connected with the EGR passage and bypass the EGR cooler; and
a flow-rate-ratio control valve capable of controlling, by adjustment of its opening degree, an EGR cooler ratio R that is a flow rate ratio of a flow rate of EGR gas flowing through the EGR cooler with respect to a total flow rate of EGR gas flowing through the EGR passage and the EGR cooler bypass passage, wherein the control device is configured, during execution of an EGR gas introduction operation that introduces EGR gas into the intake air passage, to execute an intake air temperature control for adjusting the opening degree of the flow-rate-ratio control valve such that an intake air temperature $T_b$ that is a temperature of a gas suctioned into a cylinder of the internal combustion engine approaches a target intake air temperature $T_{bt}$, and wherein, in the intake air temperature control, the control device is configured, when a designated condition that, even if the adjustment of the opening degree of the flow-rate-ratio control valve is performed, there is a temperature difference obtained by subtracting the target intake air temperature $T_{bt}$ from a value of the intake air temperature $T_b$ to be achieved as a result of the adjustment of the opening degree is met, to execute an opening-degree update prohibition processing that prohibits an update of the opening degree of the flow-rate-ratio control valve.

The control device may be configured to:
calculate, in accordance with formula (1), a required EGR cooler ratio $R_t$ that is a required value of the EGR cooler ratio R required to cause the intake air temperature $T_b$ to approach the target intake air temperature $T_{bt}$;
calculate, in accordance with formula (2), a target EGR gas temperature $T_{egrt}$ in the formula (1) that is a target value of a temperature $T_{egr}$ of the EGR gas introduced into the intake air passage; and
determine that, when the required EGR cooler ratio $R_t$ is lower than a first threshold value that is equal to or lower than 0 or when the required EGR cooler ratio $R_t$ is higher than a second threshold value that is equal to or higher than 1, the designated condition is met.

$$T_{egrt} = R_t \cdot T_{egrC} + (1 - R_t) \cdot T_{egrCBP} \quad (1)$$

$$T_{bt} = R_{egr} \cdot T_{egrt} + (1 - R_{egr}) \cdot T_a \quad (2)$$

Where, in formula (1), $T_{egrC}$ denotes a temperature of EGR gas passing through the EGR cooler and $T_{egrCBP}$ denotes a temperature of EGR gas passing through the EGR cooler bypass passage, and, in formula (2), $R_{egr}$ denotes an EGR ratio and $T_a$ denotes a temperature of fresh air at a portion of the intake air passage located on an upstream side of an EGR gas introduction port for the intake air passage.

The temperature difference may correspond to a difference between the target intake air temperature $T_{bt}$ and an estimation value of the intake air temperature $T_b$ to be achieved if the flow-rate-ratio control valve is controlled such that the EGR cooler ratio R becomes 0 or 1. Also, the control device may be configured, when an absolute value of the temperature difference is greater than a third threshold value, to determine that the designated condition is met.

The internal combustion engine may include:
a supercharger configured to supercharge intake air; and
a water-cooled intercooler device that includes an intercooler installed in a portion of the intake air passage located on a downstream side of a compressor of the supercharger and is configured to cool the intake air.

The control device may be configured, when the designated condition is met while the temperature difference is a negative value, to control the intercooler device such that a temperature of intake air flowing through a portion of the intake air passage located on a downstream side of the intercooler increases.

The internal combustion engine may include:
a supercharger configured to supercharge intake air; and
a water-cooled intercooler device that includes an intercooler installed in a portion of the intake air passage located on a downstream side of a compressor of the supercharger and is configured to cool the intake air.

The control device may be configured, when the designated condition is met while the temperature difference is a positive value, to control the intercooler device such that a temperature of intake air flowing through a portion of the intake air passage located on a downstream side of the intercooler decreases.

According to the control device for an internal combustion engine of the present disclosure, when a designated condition that, even if the adjustment of the opening degree of the flow-rate-ratio control valve is performed, there is a temperature difference obtained by subtracting the target intake air temperature Tbt from a value of the intake air temperature Tb to be achieved as a result of the adjustment of the opening degree is met, an opening-degree update prohibition processing that prohibits an update of the opening degree of the flow-rate-ratio control valve is executed. Therefore, since the opportunity of an opening degree adjustment of the flow-rate-ratio control valve is properly managed, the progress of wear of the flow-rate-ratio control valve can be reduced.

DETAILED DESCRIPTION

Figure 1:
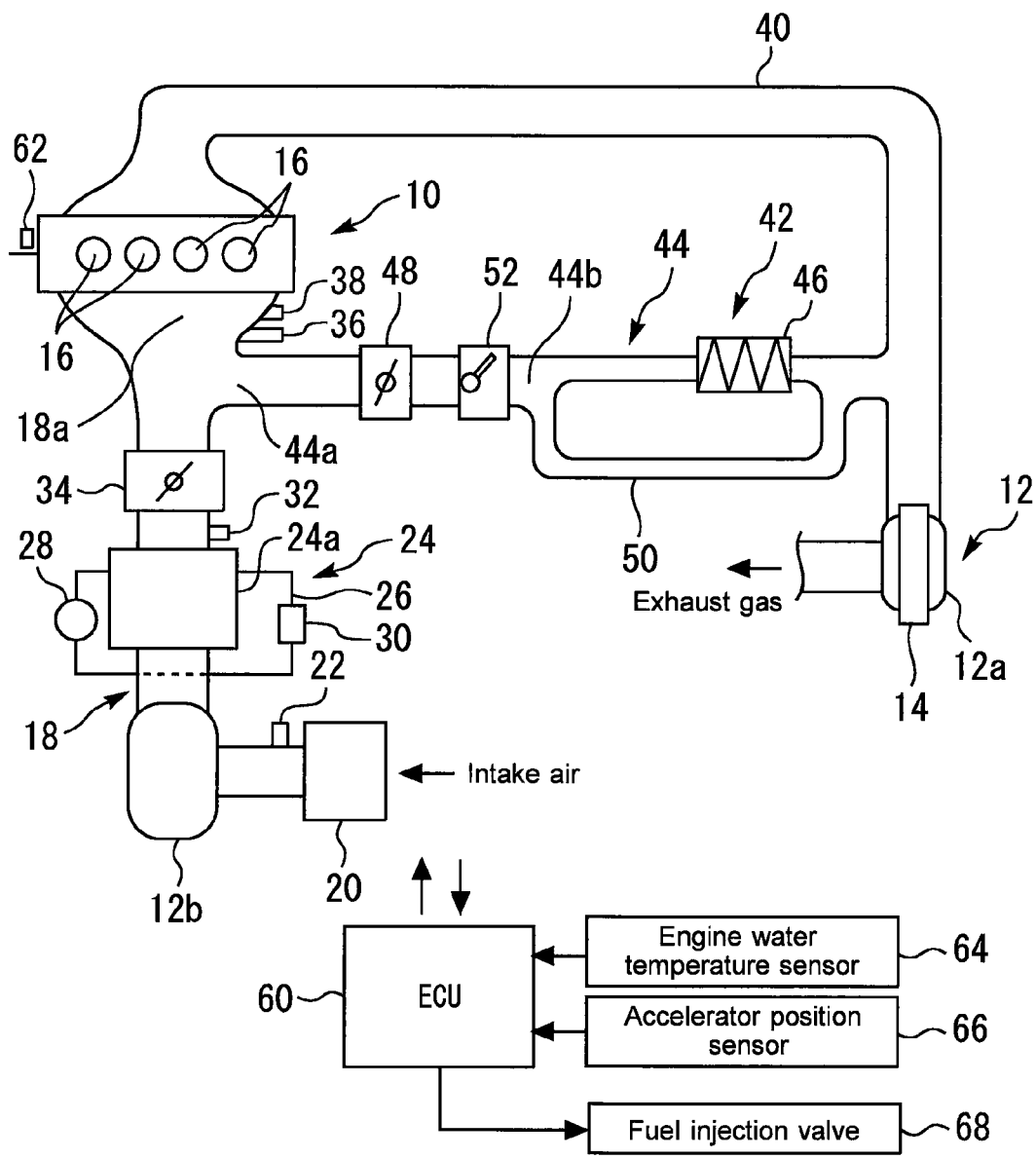
FIG. 1 is a schematic diagram for describing an example of the configuration of a system according to a first embodiment of the present disclosure.

In embodiments of the present disclosure which will be described later, elements that are the same as each other in the drawings are denoted by the same reference symbols, and redundant descriptions of those elements will be omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly shown otherwise, or unless the present disclosure is explicitly specified by the structures, steps or the like theoretically.

First Embodiment

Firstly, a first embodiment according to the present disclosure will be described with reference to FIGS. 1 to 5.

1-1. Example of Configuration of System

FIG. 1 is a schematic diagram for describing an example of the configuration of a system according to the first embodiment of the present disclosure. The system shown in FIG. 1 includes an internal combustion engine (as an example, diesel engine) 10. The internal combustion engine 10 is mounted on a vehicle, for example. Although the internal combustion engine 10 is, as an example, an in-line four-cylinder engine, the number and arrangement of cylinders of the internal combustion engine 10 are not particularly limited.

The internal combustion engine 10 is a supercharged engine as an example. More specifically, the internal combustion engine 10 is provided with a variable nozzle type turbo-supercharger 12 that includes a turbine 12a, a compressor 12b and a variable nozzle device 14, as an example of a supercharger. According to the variable nozzle device 14, the opening degree (VN opening degree) of a plurality of variable nozzle vanes is changed in order to change the flow rate of the exhaust gas that flows into the turbine 12a, whereby the boost pressure can be adjusted.

An intake air passage 18 communicates with each cylinder 16 of the internal combustion engine 10. In detail, an air cleaner 20 is provided in the vicinity of an inlet of the intake air passage 18. An air flow sensor 22 that outputs a signal responsive to the flow rate (fresh air flow rate Ga (see FIG. 2)) of the air taken into the intake air passage 18 is installed downstream of the air cleaner 20.

The compressor 12b described above is arranged in a portion of the intake air passage 18 located on the downstream side of the air cleaner 20. An intercooler 24a of a water-cooled intercooler device 24 is installed in a portion of the intake air passage 18 located on the downstream side of the compressor 12b. The intercooler device 24 is configured to cool, by the use of the intercooler 24a that provides heat exchange between the intake air and a refrigerant, the intake air (in the example shown in FIG. 1, the fresh air corresponds to this) compressed by the compressor 12b. The intercooler device 24 is equipped with a refrigerant circuit 26 for circulating the refrigerant. In addition to the intercooler 24a, an electrically-driven water pump 28 and a radiator 30 are installed on the refrigerant circuit 26. The water pump 28 is capable of adjusting the flow rate of the refrigerant that circulates the intercooler 24a. The radiator 30 releases heat that is received by the refrigerant from the intake air.

In the vicinity of the outlet of the intercooler 24a, an intake air temperature sensor 32 that outputs a signal responsive to the temperature (fresh air temperature Ta (see FIG. 2)) of the intake air (fresh air) that flows through this location is installed. Also, an electronically-controlled throttle valve 34 capable of adjusting the flow rate of the intake air that flows through the intake air passage 18 is installed downstream of the intercooler 24a. The throttle valve 34 is basically controlled so as to have the full open degree. An intake air manifold 18a for distributing the intake air toward the individual cylinders 16 is arranged downstream of the throttle valve 34. Inner passages of the intake air manifold 18a serves as a part of the intake air passage 18.

In a collective portion of the intake manifold 18a, an intake air pressure sensor 36 that outputs a signal responsive to the pressure (boost pressure or intake manifold pressure) Pb of the intake air that flows through this location and an intake air temperature sensor 38 that outputs a signal responsive to the temperature (intake air temperature Tb (see FIG. 2)) of the gas in this intake manifold 18a are installed. Moreover, an exhaust gas passage 40 communicates with each cylinder 16. The turbine 12a described above is installed in the exhaust gas passage 40.

The internal combustion engine 10 shown in FIG. 1 further includes an EGR device 42. The EGR device 42 is of a high pressure loop (HPL) type, as an example. Thus, the EGR device 42 is equipped with an EGR passage 44 adapted to connect a portion of the exhaust gas passage 40 located on the upstream side of the turbine 12a and a portion of the intake air passage 18 located on the downstream side of the compressor 12b with each other. In more detail, in the example shown in FIG. 1, an EGR gas introduction port 44a with respect to the intake air passage 18 is provided at a location that is on the downstream side of the intercooler 24a and also the throttle valve 34.

An EGR cooler 46 and an EGR valve 48 are installed in the EGR passage 44 in order from the upstream side of an EGR gas flow introduced into the intake air passage 18. The EGR cooler 46 is provided to cool the EGR gas that flows through the EGR passage 44. The EGR valve 48 is provided to adjust the amount of the EGR gas introduced into the intake air passage 18 via the EGR passage 44.

The EGR device 42 is further equipped with an EGR cooler bypass passage 50 (hereunder, simply abbreviated as a "bypass passage 50") and a flow-rate-ratio control valve 52. The bypass passage 50 is connected to the EGR passage 44 so as to bypass the EGR cooler 46. The flow-rate-ratio control valve 52 is configured to be able to control, by adjustment of its opening degree, a flow rate ratio (EGR cooler ratio R (see FIG. 2)) of the flow rate of a cooler passing-through gas flow rate GegrC (see FIG. 2) with respect to a total EGR gas flow rate Gegr (see FIG. 2).

To be more specific, the flow-rate-ratio control valve 52 is configured to be able to select arbitrary intermediate opening degrees for the control of the EGR cooler ratio R. To achieve this, the flow-rate-ratio control valve 52 is driven by a vacuum regulating valve (VRV) of a diaphragm type, or an electric motor, as an example. As an example, the flow-rate-ratio control valve 52 is installed in a collective portion of the bypass passage 50 with respect to the EGR passage 44.

As shown in FIG. 1, the system according to the present embodiment is further provided with an electronic control unit (ECU) 60. Various sensors installed in the internal combustion engine 10 and the vehicle on which the internal combustion engine 10 is mounted and various actuators for controlling the operation of the internal combustion engine 10 are electrically connected to the ECU 60.

The various sensors described above include a crank angle sensor 62, an engine cooling water temperature sensor 64 and an accelerator position sensor 66, in addition to the air flow sensor 22, the intake air temperature sensors 32 and 38, and the intake air pressure sensor 36 that are described above. The crank angle sensor 62 outputs a signal responsive to the crank angle. The ECU 60 can calculate an engine speed Ne by the use of the signals of the crank angle sensor 62. The engine water temperature sensor 64 outputs a signal responsive to engine water temperature Tw (see FIG. 2). The accelerator position sensor 66 outputs a signal responsive to the depression amount (i.e., accelerator position) of an accelerator pedal of the vehicle on which the internal combustion engine 10 is mounted. Moreover, the various actuators described above include fuel injection valves 68, as well as the variable nozzle device 14, the water pump 28, the throttle valve 34, the EGR valve 48 and the flow-rate-ratio control valve 52 that are described above.

The ECU 40 includes a processor, a memory, and an input/output interface. The input/output interface receives sensor signals from the various sensors described above, and also outputs actuating signals to the various actuators described above. In the memory, various control programs and maps for controlling the various actuators are stored. The processor reads out a control program from the memory and executes the control program. As a result, functions of the "control device for an internal combustion engine" according to the present embodiment are achieved.

1-2. Intake Air Temperature Control According to First Embodiment

According to the present embodiment, an intake air temperature control is executed by the use of flow-rate-ratio control valve 52. An example of an "intake air temperature (i.e., the temperature of a gas suctioned in the cylinders 16)" that is directed to the "intake air temperature control" according to the present embodiment is the temperature of a gas in the intake manifold 18a (intake air temperature Tb).

To be more specific, the intake air temperature control is executed during an EGR gas introduction operation. Moreover, the intake manifold 18a is located on the downstream side of the EGR gas introduction port 44a for the intake air passage 18 and also on the downstream side of the intercooler 24a. Thus, the intake air temperature Tb mentioned here is the temperature of a mixed gas of the fresh air cooled by the intercooler 24a and the EGR gas.

1-2-1. Base Operation of Intake Air Temperature Control

Figure 2:
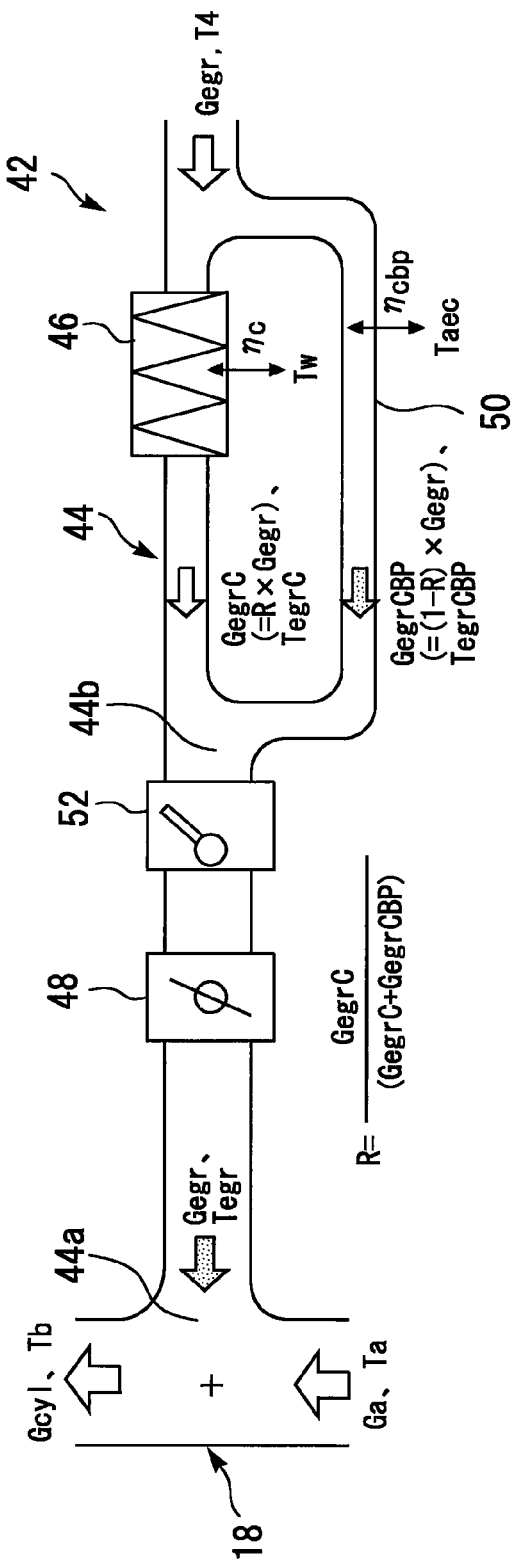
FIG. 2 is a diagram for describing various parameters associated with an intake air temperature control.

FIG. 2 is a diagram for describing various parameters associated with the intake air temperature control. In FIG. 2, Gegr denotes the total flow rate of the EGR gas that flows through the EGR passage 44 and the bypass passage 50 (total EGR gas flow rate). Tegr denotes the temperature of the EGR gas introduced into the intake air passage 18 (i.e., the temperature of the EGR gas after the EGR gas flowing through the EGR cooler 46 and the EGR gas flowing through the bypass passage 50 merge again with each other at the collective portion 44b). Moreover, GegrC and TegrC denote the flow rate and temperature of the EGR gas that flows through the EGR cooler 46 (more specifically, the gas that passes through the EGR cooler 46 to flow toward the collective portion 44b, and that also referred to as a "cooler passing-through gas"). GegrCBP and TegrCBP denote the flow rate and temperature of the EGR gas that flow through the bypass passage 50 (hereunder, also referred to as a "bypass passing-through gas").

According to the intake air temperature control, the opening degree of the flow-rate-ratio control valve 52 is adjusted, whereby the actual intake air temperature Tb is controlled so as to approach its target intake air temperature Tbt. The ECU 60 uses the "EGR cooler ratio R" for this intake air temperature control. The EGR cooler ratio R denotes a flow rate ratio of the cooler passing-through gas flow rate GegrC with respect to the total EGR gas flow rate Gegr (=GegrC+GegrCBP).

More specifically, according to the intake air temperature control, in order to cause the actual intake air temperature Tb to approach the target intake air temperature Tbt, the ECU 60 controls the flow-rate-ratio control valve 52 so as to have an opening degree depending on a "required EGR cooler ratio Rt" that is a required value (target value) of the EGR cooler ratio R.

1-2-1-1. Example of Calculation of Required EGR Cooler Ratio Rt

Figure 3:
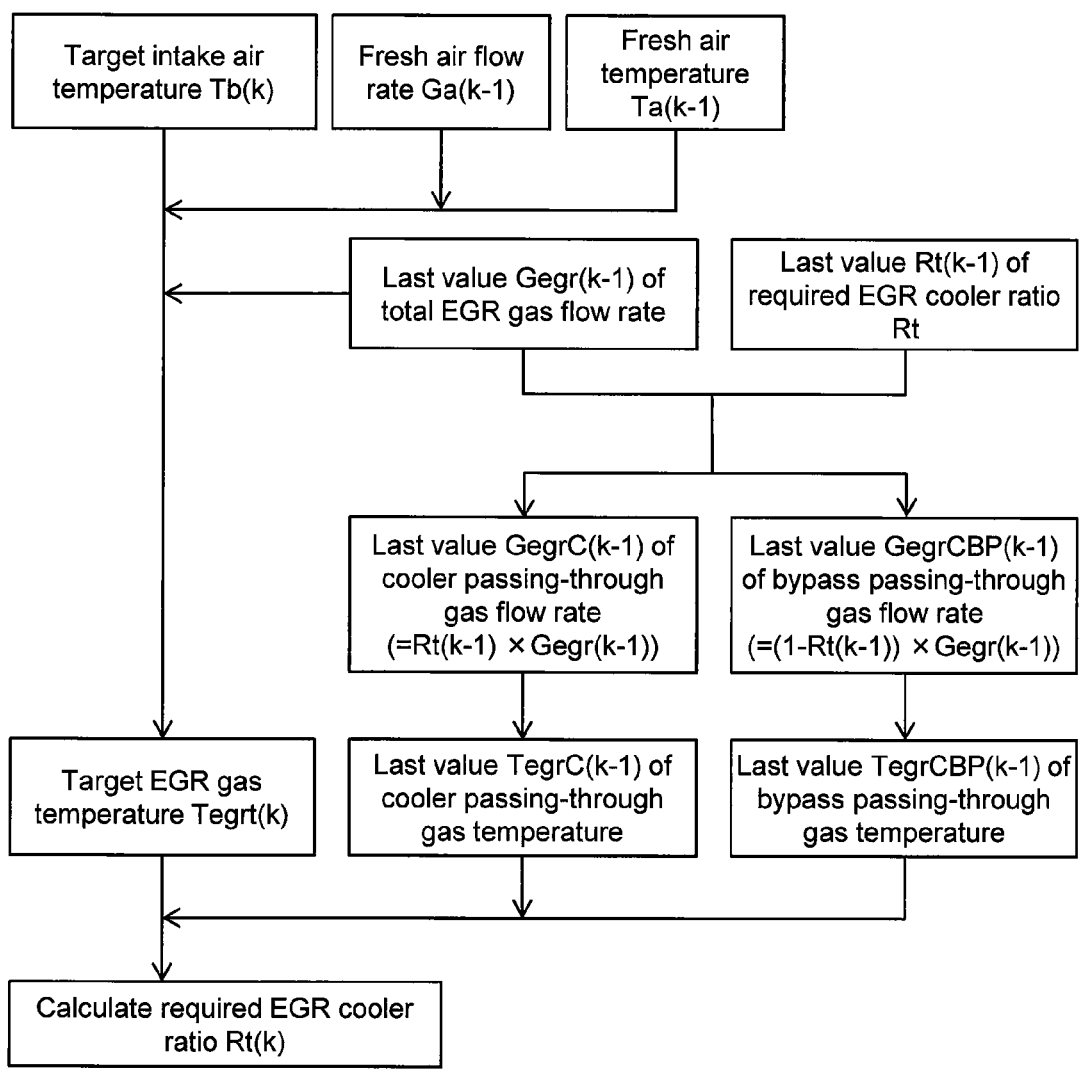
FIG. 3 is a block diagram for describing an example of calculation method of a required EGR cooler ratio Rt.

FIG. 3 is a block diagram for describing an example of calculation method of the required EGR cooler ratio Rt. The ECU 60 repeatedly performs the calculation of the required EGR cooler ratio Rt at a predetermined time interval. With regard to the following various parameters, values with a symbol "k" indicate that they are values calculated in the k-th step and are the current values of the respective parameters.

Firstly, a calculation method of parameters used for the calculation of the required EGR cooler ratio Rt(k) will be described. The parameters correspond to a target EGR gas temperature Tegrt(k), the last value TegrC(k−1) of the (actual) cooler passing-through gas temperature, and the last value TegrCBP(k−1) of the (actual) bypass passing-through gas temperature.

A target EGR gas temperature Tegrt is a target value of the temperature Tegr of the EGR gas introduced into the intake air passage 18. As an example, the target EGR gas temperature Tegrt(k) can be defined as formula (3) described below. That is to say, as shown in Formula (3), the target intake air temperature Tbt(k) can be represented as a sum of a product of the last value Regr(k−1) of the EGR ratio and the target EGR gas temperature Tegrt(k) and a product of a value (1−Regr(k−1)) obtained by subtracting the last value Regr(k−1) of the EGR ratio from 1 and the last value Ta(k−1) of the fresh air temperature.

$$Tbt(k)=Regr(k-1)\cdot Tegrt(k)+(1-Regr(k-1))\cdot Ta(k-1) \quad (3)$$

With regard to formula (3) described above, the target intake air temperature Tbt(k) can be, for example, calculated, by the use of a map or a relational formula, as a value depending on an engine operational condition (for example, fuel injection amount q (i.e., engine torque), engine speed Ne and engine water temperature Tw). In addition, the (actual) EGR rate Regr corresponds to a ratio of the total EGR gas flow rate Gegr with respect to a total intake air flow rate Gcyl (=Ga+Gegr). Thus, the last value Regr(k−1) of the (actual) EGR ratio can be calculated based on the last value Ga(k−1) of the (actual) fresh air flow rate and the last value Gegr(k−1) of the (actual) total EGR gas flow rate.

The last value Ga(k−1) of the fresh air flow rate and the last value Ta(k−1) of the fresh air temperature can be respectively obtained by the use of the air flow sensor 22 and the intake air temperature sensor 32, for example. Moreover, the last value Gegr(k−1) of the total EGR gas flow rate is, for example, obtained by subtracting the last value Ga(k−1) of the fresh air flow rate from the last value Gcyl(k−1) of the (actual) total intake air flow rate. This total intake air flow rate Gcyl corresponds to a flow rate of the intake air (mixed gas of fresh air and EGR gas) at the downstream of the EGR gas introduction port 44a for the intake air passage 18. Furthermore, the last value Gcyl(k−1) thereof can be, for example, calculated, by the use of a map or a relational formula, as a value depending on the last value Pb(k−1) of the boost pressure and the last value Tb(k−1) of the intake air temperature Tb. It should be noted that the last value Pb(k−1) and the last value Tb(k−1) can be respectively obtained by the use of the intake air pressure sensor 36 and the intake air temperature sensor 38, for example.

Thus, by substituting, into formula (3), the target intake air temperature Tbt(k), the last value Regr(k−1) of the EGR ratio and the last value Ta(k−1) of the fresh air temperature that are obtained as described above, the target EGR gas temperature Tegrt(k) can be calculated as a value that satisfies the target intake air temperature Tbt(k).

The last value TegrC(k−1) of the cooler passing-through gas temperature and the last value TegrCBP(k−1) of the bypass passing-through gas temperature that are the rest of the parameters used for the calculation of the required EGR cooler ratio Rt(k) can be calculated as follows, for example.

That is to say, firstly, the last value GegrC(k−1) of the cooler passing-through gas flow rate and the last value GegrCBP(k−1) of the bypass passing-through gas flow rate are calculated by the use of the last value Gegr(k−1) of the total EGR gas flow rate and the last value Rt(k−1) of the required EGR cooler ratio Rt. More specifically, a product (Rt(k−1)×Gegr(k−1)) of the last value Rt(k−1) and the last value Gegr(k−1) is calculated as the last value GegrC(k−1) of the cooler passing-through gas flow rate. Moreover, a product ((1−Rt(k−1))×Gegr(k−1)) of a value (1−Rt(k−1)) obtained by subtracting the last value Rt(k−1) from 1 and the last value Gegr(k−1) is calculated as the last value GegrCBP(k−1) of the bypass passing-through gas flow rate.

The calculation of the last value TegrC(k−1) of the cooler passing-through gas temperature based on the last value GegrC(k−1) of the cooler passing-through gas flow rate that is calculated as described above can be performed using, for example, a heat-release calculation using a general analysis method of the heat-transfer engineering. According to this heat-release calculation, under a predetermined boundary condition and various calculation conditions, a temperature of the cooler passing-through gas (which corresponds to the last value TegrC(k−1)) that would be achieved after heat release at the time of the cooler passing-through gas with the last value GegrC(k−1) passing through the EGR cooler 46 is calculated. The calculation of the last value TegrCBP(k−1) of the bypass passing-through gas temperature based on the last value GegrCBP(k−1) of the bypass passing-through gas flow rate can be similarly performed. It should be noted that the boundary condition mentioned here relates to, for example, the engine water temperature Tw, and temperature Taec of the gas in the engine compartment of the vehicle for installing the internal combustion engine 10. Also, the calculation conditions relate to, for example, temperature T4 of the exhaust gas introduced into the EGR passage 44 (which can be estimated by the use of a known method, for example), a cooling efficiency ηc (for example, a known value) of the EGR cooler 46, and a heat release efficiency ηcbp (for example, a known value) of the bypass passage 50.

As an example, the required EGR cooler ratio Rt(k) is defined in association with the parameters obtained as described above (i.e., Tegrt(k), TegrC(k−1) and TegrCBP(k−1)) as formula (4) described below. That is to say, as shown in formula (4), the target EGR gas temperature Tegrt can be represented as a sum of a product of the required EGR cooler ratio Rt(k) and the last value TegrC(k−1) of the cooler passing-through gas temperature and a product of a value (1−Rt(k)) obtained by subtracting the required EGR cooler ratio Rt(k) from 1 and the last value TegrCBP(k−1) of the bypass passing-through gas temperature.

$$\text{Tegrt}(k) = Rt(k) \cdot \text{TegrC}(k-1) + (1 - Rt(k)) \cdot \text{TegrCBP}(k-1) \quad (4)$$

According to formula (4) described above, the required EGR cooler ratio Rt(k) depending on the target EGR gas temperature Tegrt(k), the last value TegrC(k−1) of the cooler passing-through gas temperature and the last value TegrCBP(k−1) of the bypass passing-through gas temperature can be calculated. Moreover, as already described, the target EGR gas temperature Tegrt(k) is calculated as a value that satisfies the target intake air temperature Tbt(k).

Thus, according to the intake air temperature control of the present embodiment, the target EGR gas temperature Tegrt that satisfies the target intake air temperature Tbt is calculated, and the flow-rate-ratio control valve 52 is adjusted so as to have an opening degree corresponding to the required EGR cooler ratio Rt required to achieve the target EGR gas temperature Tegrt which is calculated. As a result, the opening degree of the flow-rate-ratio control valve 52 is adjusted such that the actual intake air temperature Tb approaches the target intake air temperature Tbt.

1-2-1-2. Meaning of Required EGR Cooler Ratio Rt

Formula (4) described above can be modified as formula (5) mentioned below. It should be noted that the last value TegrCBP(k−1) of the bypass passing-through gas temperature becomes higher than the last value TegrC(k−1) of the temperature of the cooler passing-through gas cooled by the EGR cooler 46. Therefore, under precondition that the cooling by the EGR cooler 46 is performed, the denominator of the right-hand side of formula (5) always becomes positive.

$$Rt(k) = \frac{\text{TegrCBP}(k-1) - \text{Tegrt}(k)}{\text{TegrCBP}(k-1) - \text{TegrC}(k-1)} \quad (5)$$

Example of Rt(k)=0

According to formula (5), when the numerator of the right-hand side thereof becomes zero, that is, in an example in which the target EGR gas temperature Tegrt(k) is equal to the last value TegrCBP(k−1) of the bypass passing-through gas temperature, the required EGR cooler ratio Rt(k) becomes zero. According to the intake air temperature control, in this example, the opening degree of the flow-rate-ratio control valve 52 is adjusted such that all the amount of the EGR gas flows through the bypass passage 50 (i.e., such that a bypass passing-through flow rate ratio becomes 100%).

Example of Rt(k)=1

Moreover, according to formula (5), in an example in which the target EGR gas temperature Tegrt(k) is equal to the last value TegrC(k−1) of the cooler passing-through gas temperature, the required EGR cooler ratio Rt(k) becomes 1. According to the intake air temperature control, in this example, the opening degree of the flow-rate-ratio control valve 52 is adjusted such that all the amount of the EGR gas flows through the EGR cooler 46 (i.e., such that a cooler passing-through flow rate ratio becomes 100%).

Example of 0<Rt(k)<1

Moreover, according to formula (5), in an example in which the numerator of the right-hand side thereof becomes positive and the target EGR gas temperature Tegrt(k) is higher than the last value TegrC(k−1) of the cooler passing-through gas temperature (i.e., TegrC(k−1)<Tegrt(k)<TegrCBP(k−1)), the required EGR cooler ratio Rt(k) becomes greater than 0 and smaller than 1 (0<Rt(k)<1). According to the intake air temperature control, in this example, the opening degree of the flow-rate-ratio control valve 52 is adjusted such that the cooler passing-through flow rate ratio becomes greater when the required EGR cooler ratio Rt(k) is higher.

Example of Rt(k)>1

Moreover, according to formula (5), in an example in which the numerator of the right-hand side thereof becomes positive and the target EGR gas temperature Tegrt(k) is lower than the last value TegrC(k−1) of the cooler passing-through gas temperature (i.e., Tegrt(k)<TegrC(k−1)<TegrCBP(k−1)), the required EGR cooler ratio Rt(k) becomes greater than 1 (Rt(k)>1). This means that the target EGR gas temperature Tegrt(k) that is lower than the EGR gas temperature Tegr that is obtained when the cooler passing-through flow rate ratio is made 100% is required. Therefore, in this example, even if the flow-rate-ratio control valve 52 is controlled such that the cooler passing-through flow rate becomes 100%, the target EGR gas temperature Tegrt(k) cannot be achieved.

Example of Rt(k)<0

Furthermore, according to formula (5), in an example in which the numerator of the right-hand side thereof becomes negative (i.e., TegrCBP(k−1)<Tegrt(k)), the required EGR cooler ratio Rt(k) becomes negative (Rt(k)<0). This means that the target EGR gas temperature Tegrt(k) that is higher than the EGR gas temperature Tegr that is obtained when the cooler passing-through flow rate ratio is made 0% (in other words, when the bypass passing-through flow rate is made 100%) is required. Therefore, in this example, even if the flow-rate-ratio control valve 52 is controlled such that the cooler passing-through flow rate becomes 0%, the target EGR gas temperature Tegrt(k) cannot be achieved.

Figure 4:
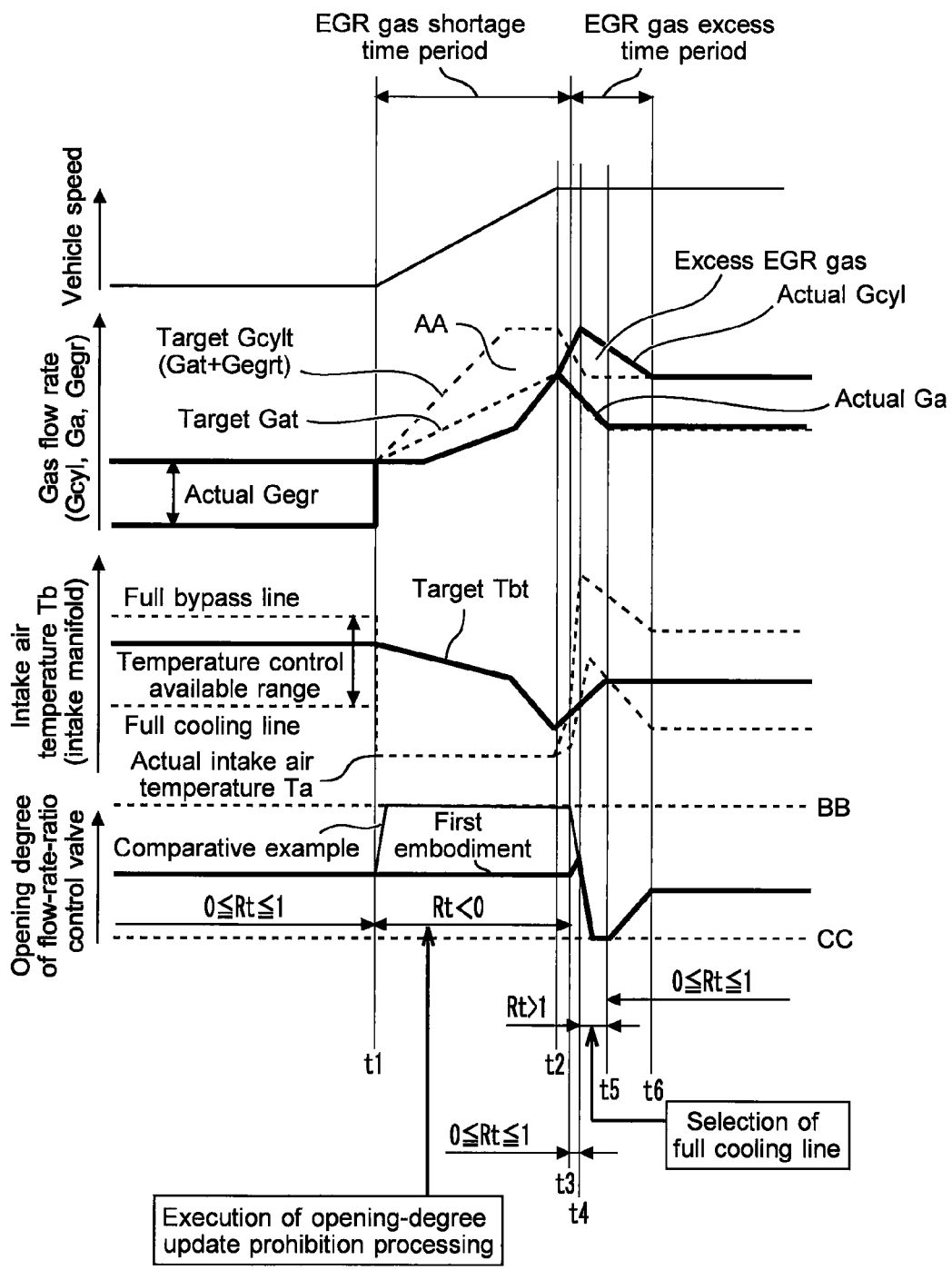
FIG. 4 is a time chart for describing a problem on the intake air temperature control (i.e., a comparative example having this problem) and an opening-degree update prohibition processing according to the first embodiment as a countermeasure against the problem.

1-2-2. Problem on Intake Air Temperature Control and Countermeasure Thereagainst FIG. 4 is a time chart for describing a problem on the intake air temperature control (i.e., a comparative example having this problem) and an opening-degree update prohibition processing according to the first embodiment as a countermeasure against the problem. FIG. 4 schematically shows various waveforms concerning the intake air temperature control during acceleration and after the acceleration.

It should be noted that, as a premise, Gcylt denotes a target value of the total intake air flow rate Gcyl. A target value Gat of the fresh air flow rate Ga is set to a value depending on, for example, the engine operating condition (mainly, fuel injection amount q (i.e., engine torque) and engine speed Ne). Also, the target value Gegrt of the total EGR gas flow rate Gegr is similarly set to a value depending on, for example, the engine operating condition (mainly, fuel injection amount q and engine speed Ne). Moreover, the target total intake air flow rate Gcylt corresponds to the sum of the target fresh air flow rate Gat and the target EGR gas flow rate Gegrt. Furthermore, during the EGR gas introduction operation, the ECU 60 controls the EGR valve 48, as a premise, such that an opening degree depending on the target EGR gas flow rate Gegrt is obtained.

1-2-2-1. Problem on Intake Air Temperature Control and Comparative Example Having This Problem A time point t1 in FIG. 4 corresponds to a time point at which depression of the accelerator pedal by a driver of the vehicle is made (i.e., acceleration request time point). During a time period before the time point t1 (i.e., before an acceleration), a steady condition that the fuel injection amount q (engine torque) and the engine speed Ne is kept constant or substantially constant with respect to a lapse of time is met.

Moreover, during a time period before the time point t1, the actual EGR gas flow rate Gegr depending on the target EGR gas flow rate Gegrt is properly achieved. Thus, as shown in FIG. 4, the actual total intake air flow rate Gcyl becomes greater than the actual fresh air flow rate Ga by the actual EGR gas flow rate Gegr. In this way, if the actual EGR gas flow rate Gegr is properly achieved, the EGR gas temperature Tegr can be controlled by adjustment of the opening degree of the flow-rate-ratio control valve 52. Therefore, during this time period, a control available range of the intake air temperature Tb by the adjustment of the opening degree of the flow-rate-ratio control valve 52 is widely achieved. As a result, the actual intake air temperature Tb favorably converges to the target intake air temperature Tbt.

It should be noted that the upper limit of the temperature control available range described above corresponds to a full bypass line on which the actual intake air temperature Tb is controlled by the use of the bypass passing-through flow rate ratio 100% (R=0). On the other hand, the lower limit of this temperature control available range corresponds to a full cooling line on which the actual intake air temperature Tb is controlled by the use of the cooler passing-through flow rate ratio 100% (R=1).

Next, a time period from the time point t1 to a time point t2 corresponds to an acceleration time period. Upon an acceleration request being made at the time point t1, the ECU 60 controls the fuel injection valve 68 such that the fuel injection amount q increases. In more detail, in order to ensure a favorable acceleration performance, the ECU 60 controls the fuel injection valve 68, during the acceleration, such that a greater amount of fuel than that required to steadily maintain the vehicle speed after the acceleration is injected. Moreover, the ECU 60 increases the target fresh air flow rate Gat in association with an increase of the fuel injection amount q. In order to satisfy the increased target fresh air flow rate Gat, the ECU 60 then controls the variable nozzle device 14 such that the VN opening degree becomes smaller. Furthermore, the target EGR gas flow rate Gegrt also increases in association with an increase of the target fresh air flow rate Gat. As a result, the target total intake air flow rate Gcylt (=Gat+Gegrt) also increases. It should be noted that, as shown in FIG. 4, the ECU 60 decreases the target intake air temperature Tbt in association with an increase of the fuel injection amount q (engine load) as a result of the acceleration.

After the target fresh air flow rate Gat becomes greater, the actual fresh air flow rate Ga becomes greater with a delay due to a supercharging delay. Also, the delay of increase of the actual EGR gas flow rate Gegr becomes greater than the delay of the actual fresh air flow rate Ga. As a result, in the example shown in FIG. 4, during an increase of the actual fresh air flow rate Ga, the actual total intake air flow rate Gcyl becomes equivalent to the actual fresh air flow rate Ga. In other words, during the acceleration time period (t1-t2), the actual total intake air flow rate Gcyl consists mostly of the actual fresh air flow rate Ga due to the supercharging delay. After the acceleration ends at the time point t2, the increment of the fuel injection amount q for achieving a favorable acceleration performance is ended, and, as a result, the target fresh air flow rate Gat and the target EGR gas flow rate Gegrt start to decrease.

A time point t3 corresponds to a time point at which the actual total intake air flow rate Gcyl catches up with the target total intake air flow rate Gcylt that decreases in association with decreases of the target fresh air flow rate Gat and the target EGR gas flow rate Gegrt. Thus, a time period from the time point t1 to the time point t3 corresponds to an "EGR gas shortage time period" in which the actual EGR gas flow rate Gegr becomes insufficient with respect to the target EGR gas flow rate Gegrt due to the supercharging delay. It should be noted that the target intake air temperature Tbt after the elapse of the time point t2 starts to increase as a result of the end of the increment of the fuel injection amount q (i.e., decrease of the engine load).

Moreover, in the example shown in FIG. 4, the temperature control available range during the EGR gas shortage time period is substantially zero, due to the shortage of the EGR gas, in a temperature range that is lower than the target intake air temperature Tbt. Because of this, during the EGR gas shortage time period in which the target intake air temperature Tbt is away from the temperature control available range, even if the adjustment of the opening degree of the flow-rate-ratio control valve 52 is performed, it becomes impossible to control the actual intake air temperature Tb to the target intake air temperature Tbt by the use of the control of the actual EGR gas temperature Tegr. As a result, the actual intake air temperature Tb continuously decreases toward the actual fresh air temperature Ta after the elapse of the time point t1.

In further addition to the above, depending on the extent of the shortage of the EGR gas, the temperature control available range may be slightly obtained during the EGR gas shortage time period, contrary to the example shown in FIG. 4. However, even if the opening degree of the flow-rate-ratio control valve 52 that corresponds to the full bypass line is selected within this kind of narrow temperature control available range, it is difficult to increase the actual intake air temperature Tb satisfactorily. This is because the fact remains that the target intake air temperature Tbt is away from the temperature control available range due to the shortage of the actual EGR gas flow rate Gegr.

Comparative Example

When the actual EGR gas flow rate Gegr is less than the actual fresh air flow rate Ga, the EGR ratio Regr becomes lower. Thus, according to the relationship of formula (3) described above, during the EGR gas shortage time period in which the EGR ratio Regr becomes extremely small, a high value is calculated as the target EGR gas temperature Tegrt that satisfies the target intake air temperature Tbt. More specifically, a value that is higher than the temperature TegrCBP of the bypass passing-through gas that does not pass through the EGR cooler 46 is calculated as the target EGR gas temperature Tegrt (however, as a premise of this calculation, it is supposed that the target intake air temperature Tbt is higher than the fresh air temperature Ta). If this kind of value is calculated as the target EGR gas temperature Tegrt, the required EGR cooler ratio Rt has negative values (Rt<0) during the EGR gas shortage time period as seen from the relationship of formula (5) described above.

The waveform of thin line concerning the opening degree of the flow-rate-ratio control valve 52 in FIG. 4 corresponds to a comparative example that is referred to for comparison with the control of the flow-rate-ratio control valve 52 according to the first embodiment. In this comparative example, during the EGR gas shortage time period in which a negative value is calculated as the required EGR cooler ratio Rt, the opening degree of the flow-rate-ratio control valve 52 is adjusted to an opening degree that corresponds to zero that is the minimum value of the required EGR cooler ratio Rt which is available. In other words, the opening degree of the flow-rate-ratio control valve 52 is adjusted to an opening degree that corresponds to the full bypass line (i.e., bypass passing-through flow rate ratio 100%).

As described above, during the EGR gas shortage time period, the EGR gas temperature Tegr cannot be increased to the target EGR gas temperature Tegrt due to the shortage of the EGR gas even if the adjustment of the opening degree of the flow-rate-ratio control valve 52 is performed, and the actual intake air temperature Tb cannot thus be increased to the target intake air temperature Tbt. However, according to the comparative example, even when the intake air temperature control cannot be satisfactorily performed in this way, an unnecessary adjustment of the opening degree of the flow-rate-ratio control valve 52 is performed in order to achieve the target intake air temperature Tbt as soon as possible. As a result, the frequency of the adjustment of the opening degree of the flow-rate-ratio control valve 52 unnecessarily becomes high (in other words, the amount of operation of the flow-rate-ratio control valve 52 becomes great), and there is a concern that the wear of a moving portion (for example, a valve shaft) of the flow-rate-ratio control valve 52 may progress.

1-2-2-2. Opening-Degree Update Prohibition Processing (Countermeasure for Example of Rt<0)

In view of the problem described above, the intake air temperature control according to the present embodiment includes an "opening-degree update prohibition processing" that is executed when the following "designated condition" is met. The designated condition mentioned here means that, even if the adjustment of the opening degree of the flow-rate-ratio control valve 52 is executed, there is a temperature difference (for convenience of description, referred to as a "temperature difference ΔTin") obtained by subtracting the target intake air temperature Tbt from the value of the actual intake air temperature Tb that reaches as a result of the adjustment of the opening degree. This temperature difference ΔTin corresponds to an example of the "temperature difference" according to the present disclosure. The opening-degree update prohibition processing is performed to prohibit the update of the opening degree of the flow-rate-ratio control valve 52.

As already described, during the EGR gas shortage time period shown in FIG. 4, even if the adjustment of the opening degree of the flow-rate-ratio control valve 52 is performed, the value of the actual intake air temperature Tb that reaches as a result of the adjustment of the opening degree may not be increased to the target intake air temperature Tbt. Because of this, it can be said that the designated condition described above is met during the EGR gas shortage time period. In addition, as already described, the required EGR cooler ratio Rt during the EGR gas shortage time period has negative values (Rt<0).

Accordingly, according to the present embodiment, when the required EGR cooler ratio Rt becomes lower than a threshold value TH1 (as an example, zero) during the EGR gas introduction operation associated with the intake air temperature control, it is determined that the designated condition described above is met, and the opening-degree update prohibition processing is executed. More specifically, if the opening-degree update prohibition processing is applied to the example of operation shown in FIG. 4, the opening degree of the flow-rate-ratio control valve 52 during the EGR gas shortage time period (t1-t3) is kept at the opening degree at the time point t1 of the acceleration request. It should be noted that the threshold value TH1 corresponds to an example of the "first threshold value" according to the present disclosure.

Operation During Time Period after Time Point t3

Next, operation during a time period after the time point t3 in the example of the operation shown in FIG. 4 will be described.

In the example shown in FIG. 4, after the time point t3 at which the shortage of the EGR gas is eliminated, the EGR gas becomes excess as a result of the actual EGR gas flow rate Gegr increasing with a response delay. As a result, the temperature control available range is obtained again while the temperature level of the temperature control available range becomes higher. In particular, the upper limit value (full bypass line) of the temperature control available range rapidly increases due to an excess increase of the actual EGR gas flow rate Gegr. It should be noted that, in the example shown in FIG. 4, an EGR gas excess time period continues from the time point t3 until a time point t6 (i.e., time point at which the actual total intake air flow rate Gcyl converges to the target total intake air flow rate Gcylt).

During a time period from the time point t3 to a time point t4, the time control available range becomes wide due to an excess increase of the actual EGR gas flow rate Gegr. As a result, the target intake air temperature Tbt temporarily enters into the temperature control available range. Moreover, in this time period (t3-t4), the value of the required EGR cooler ratio Rt is temporarily within a range that is equal to or higher than 0 and equal to or lower than 1 due to an excess increase of the actual EGR gas flow rate Gegr. Thus, according to the base operation of the intake air temperature control, at the time point t3, the opening degree of the flow-rate-ratio control valve 52 starts to be adjusted such that, in order to increase the actual intake air temperature Tb toward the target intake air temperature Tbt, the opening degree of the flow-rate-ratio control valve 52 coincides with an opening degree that corresponds to a higher EGR cooler ratio R.

The time point t4 corresponds to a time point at which the target intake air temperature Tbt gets away from the lower limit value (i.e., full cooling line) of the temperature control available range as a result of an increase of the temperature level of the temperature control available range. A time point t5 corresponds to a time point at which the target intake air temperature Tbt intersects again with the full cooling line as a result of the amount of an excess EGR gas being decreased.

During a time period from the time point t4 as described above to a time point t5, even when the opening degree that corresponds to the full cooling line is selected as the opening degree of the flow-rate-ratio control valve 52, the target intake air temperature Tbt may not be satisfied due to an excess EGR gas. In addition, in this time period (t4-t5), the required EGR cooler ratio Rt becomes higher than 1 (Rt>1) due to the following reason.

That is to say, when the actual EGR gas flow rate Gegr is too large relative to its adequate value, the EGR ratio Regr becomes higher than its adequate value (i.e., target value). Because of this, according to the relationship of formula (3) described above, when the EGR ratio Regr becomes too high, a low value is calculated as the target EGR gas temperature Tegrt that satisfies the target intake air temperature Tbt. More specifically, a value that is lower than the cooler passing-through gas temperature TegrC is calculated as the target EGR gas temperature Tegrt (however, as a premise of this calculation, it is supposed that the target intake air temperature Tbt is higher than the fresh air temperature Ta). Also, if this kind of value is calculated as the target EGR gas temperature Tegrt, the required EGR cooler ratio Rt becomes higher than 1 (Rt>0) during the time period (t4-t5) in which the amount of the EGR gas is excess, as can be seen from the relationship of formula (5) described above.

In the present embodiment, it is supposed that, in the above-described time period (t4-t5) included in the EGR gas excess time period, the required EGR cooler ratio Rt is set, in accordance with the base operation of the intake air temperature control, to 1 that is the maximum value of values that can be instructed to the flow-rate-ratio control valve 52. In other words, the flow-rate-ratio control valve 52 is adjusted so as to have an opening degree that corresponds to the full cooling line in order to realize the cooler passing-through flow rate ratio 100%. As a result, the actual intake air temperature Tb during the time period (t4-t5) shifts so as to conform with the full cooling line. The actual intake air temperature Tb during the time period (t4-t5) is lowered as much as possible by this kind of control, whereby an increase of NOx emission amount due to the fact that the amount of the EGR gas is excess (that is, the actual intake air temperature Tb is high) can be reduced.

After the time point t5 has elapsed, elimination of an excess amount of EGR gas gradually progresses. As a result, the engine operating condition shifts toward a condition that a proper amount of the EGR gas is achieved, and, the value of the required EGR cooler ratio Rt falls again within the range that is equal to or higher than 0 and equal to or lower than 1. The actual intake air temperature Tb can therefore converge to the target intake air temperature Tbt by the base operation of the intake air temperature control (i.e., the adjustment of the opening degree of the flow-rate-ratio control valve 52).

1-2-3. Processing of ECU Concerning Intake Air Temperature Control

Figure 5:
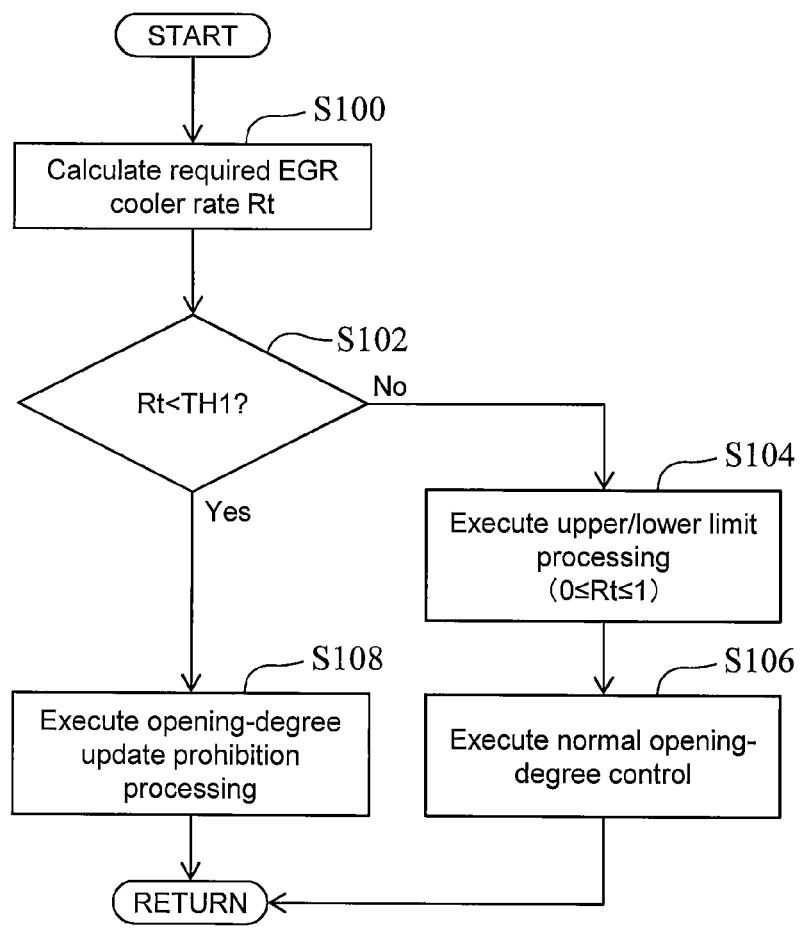
FIG. 5 is a flow chart that illustrates a routine of the processing concerning the intake air temperature control according to the first embodiment of the present disclosure.

FIG. 5 is a flow chart that illustrates a routine of the processing concerning the intake air temperature control according to the first embodiment of the present disclosure. The ECU 60 repeatedly executes the present routine at a predetermined time interval during execution of the EGR gas introduction operation.

According to the routine shown in FIG. 5, firstly, the ECU 50 calculates the required EGR cooler ratio Rt (step S100). The required EGR cooler ratio Rt is calculated by the use of the method that is described with reference to FIG. 3.

Next, the ECU 60 determines whether or not the required EGR cooler ratio Rt which is calculated is lower than the predetermined threshold value TH1 (step S102). The threshold value TH1 is zero as an example. As a result, if the determination result of step S102 is negative (Rt≥TH1), the ECU 60 proceeds to step S104.

In step S104, the ECU 60 executes an upper/lower limit processing for falling the required EGR cooler ratio Rt calculated in step S100 within a range associated with the opening degree control range of the flow-rate-ratio control valve 52 (0≤Rt≤1). In an example of the required EGR cooler ratio Rt being equal to or higher than 0 (threshold value TH1) and equal to or lower than 1 (0≤Rt≤1) or in an example of the required EGR cooler ratio Rt being higher than 1 (Rt>1), the processing proceeds to step S104. In the former example, correction of the required EGR cooler ratio Rt is not performed since it is not required. On the other hand, in the latter example, the upper/lower limit processing is executed in order to correct the required EGR cooler ratio Rt to 1.

Next, the ECU 60 executes a normal opening-degree control (step S106). As represented in FIG. 4, the opening degree of the flow-rate-ratio control valve 52 is associated with the EGR cooler ratio R. In detail, the ECU 60 stores a map of the opening degree of the flow-rate-ratio control valve 52 associated with the required EGR cooler ratio Rt. In step S106, the ECU 60 calculates, from the map described above, an opening degree depending on the required EGR cooler ratio Rt that is calculated in step S102 or corrected in step S104, and controls the flow-rate-ratio control valve 52 such that the calculated opening degree is achieved.

If, on the other hand, it is determined in step S102 that the required EGR cooler ratio Rt is lower than the threshold value TH1 (Rt<TH1), that is, if it can be judged that the "designated condition" described above is met, the ECU 60 proceeds to step S108. In step S108, the ECU 60 executes the opening-degree update prohibition processing described above. Also, if the determination result of step S102 continuously becomes positive, the ECU 60 continues the opening-degree update prohibition processing. As a result, the opening degree of the flow-rate-ratio control valve 52 is maintained at an opening degree at the start time point of the opening-degree update prohibition processing.

1-2-4. Advantageous Effects Concerning Intake Air Temperature Control

As described so far, according to the intake air temperature control of the present embodiment, if the required EGR cooler ratio Rt is lower than the threshold value TH1 (=0) (that is, if the "designated condition" described above is met), the opening-degree update prohibition processing is executed. As a result, since the frequency of moving the flow-rate-ratio control valve 52 decreases, the progress of wear of a moving part of the flow-rate-ratio control valve 52 can be reduced.

In more detail, according to the opening-degree update prohibition processing, when, even if the adjustment of the opening degree of the flow-rate-ratio control valve 52 is performed, there is a gap between the value of the actual intake air temperature Tb that reaches as a result of the adjustment of the opening degree and the target intake air temperature Tbt, an unnecessary or not-so-effective adjustment of the opening degree of the flow-rate-ratio control valve 52 can be prevented from being performed. Therefore, the progress of wear of a moving part of the flow-rate-ratio control valve 52 can be reduced while the opportunity of the adjustment of the opening degree of the flow-rate-ratio control valve 52 is caused not to be limited under a condition that the intake air temperature control can be properly performed.

1-3. Modification Example Concerning First Embodiment (Other Example of Threshold Value TH1)

In the first embodiment described above, 0 is used as an example of the threshold value TH1. However, the threshold value TH1 is not limited to 0 as long as it is equal to or smaller than 0, and may alternatively be an arbitrary value (i.e., arbitrary negative value) that is smaller than 0. According to the relationship of formula (5) described above, what the value of the required EGR cooler ratio Rt becomes higher on the negative side means that the target EGR gas temperature Tegrt is greater than the bypass passing-through gas temperature TegrCBP and the difference therebetween is greater. Because of this, the greater the value of the required EGR cooler ratio Rt is on the negative side, the greater the amount of decrease of the actual intake air temperature Tb with respect to the target intake air temperature Tbt becomes when the opening degree of the flow-rate-ratio control valve 52 associated with the full bypass line (R=0) is selected. Accordingly, the threshold value TH1 may alternatively be made an arbitrary negative value, and the opening-degree update prohibition processing may thus be executed only when it is supposed that the above-described amount of decrease is greater than a certain level.

Second Embodiment

Next, a second embodiment according to the present disclosure will be described with reference to FIGS. 6 and 7. It should be noted that, in the following description, the configuration shown in FIG. 1 is supposed to be used as an example of the configuration of a system according to the second embodiment. This also applies to third to fifth embodiments described later.

2-1. Intake Air Temperature Control According to Second Embodiment

The intake air temperature control according to the present embodiment is different from the intake air temperature control according to the first embodiment in terms of the contents of the "designated condition" that corresponds to the execution condition of the "opening-degree update prohibition processing".

More specifically, according to the first embodiment, it is determined, when the required EGR cooler ratio Rt is lower than the threshold value TH1 (=0), that the designated condition is met. In contrast to this, according to the present embodiment, the designated condition is determined to be met not only when the required EGR cooler ratio Rt is lower than the threshold value TH1 (for example, 0) but also when the required EGR cooler ratio Rt is higher than a threshold value TH2 (for example, 1). It should be noted that the threshold value TH2 corresponds to an example of the "second threshold value" according to the present disclosure.

2-1-1. Example of Operation of Intake Air Temperature Control

Figure 6:
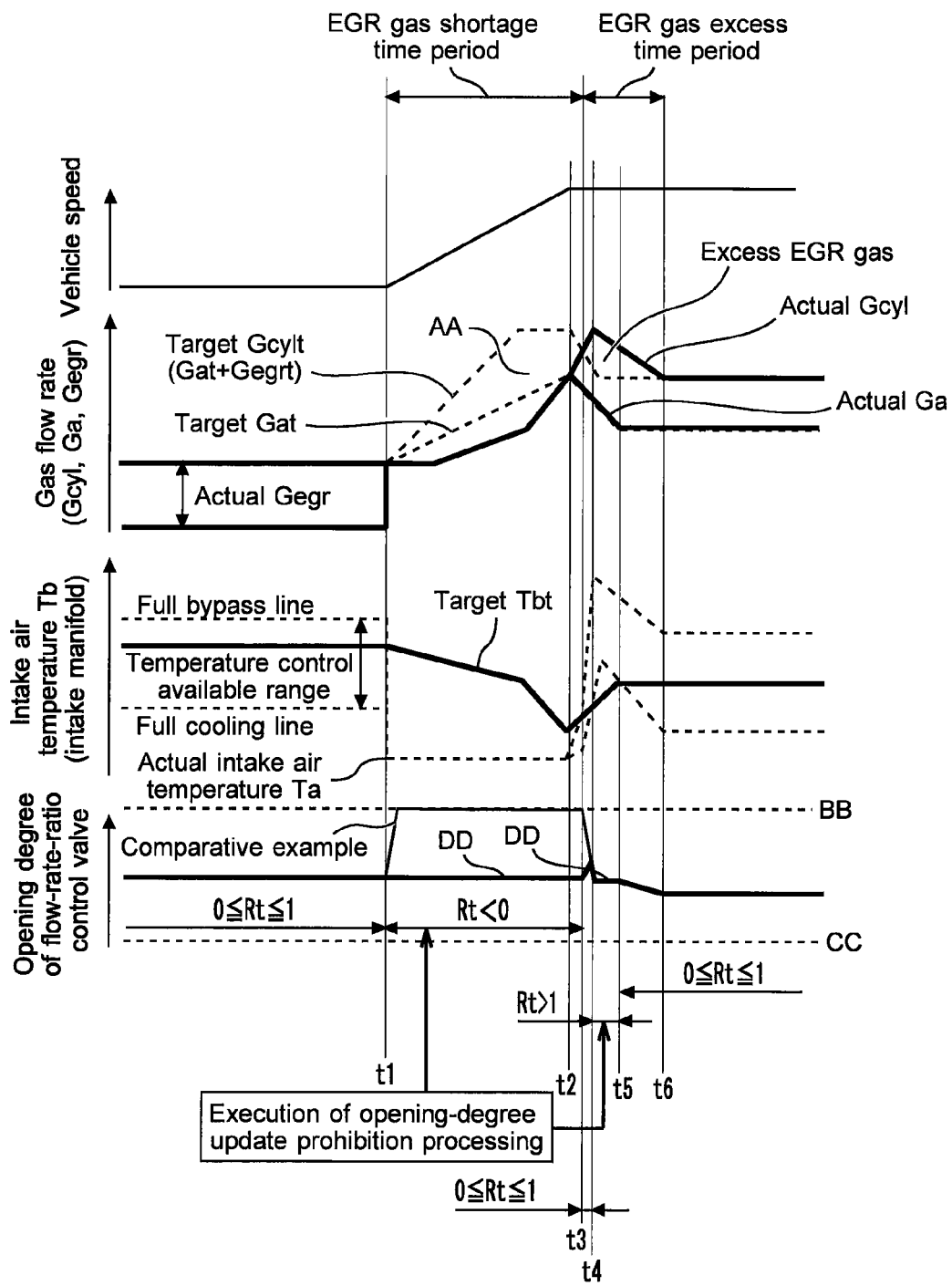
FIG. 6 is a time chart for describing an example of the operation of an intake air temperature control according to a second embodiment of the present embodiment.

FIG. 6 is a time chart for describing an example of the operation of the intake air temperature control according to the second embodiment of the present embodiment. The example of the operation shown in FIG. 6 is similar to that shown in FIG. 4 except for the points described below.

In the example shown in FIG. 6, similarly to the example shown in FIG. 4, it is determined that the designated condition is met in the EGR gas shortage time period in which the required EGR cooler ratio Rt is lower than 0. Furthermore, in the example shown in FIG. 6, even during the time period (t4-t5) in the EGR gas excess time period, that is, even during the time period in which the required EGR cooler ratio Rt is higher than 1, it is determined that the designated condition is met. Therefore, in the example shown in FIG. 6, the opening-degree update prohibition processing is executed not only during the EGR gas shortage time period but also during the time period (t4-t5).

To be more specific, if the opening-degree update prohibition processing is executed for the time period (t4-t5), the opening degree of the flow-rate-ratio control valve 52 during this time period (t4-t5) is held at the opening degree at the time point t4. As a result, the actual intake air temperature Tb during the time period (t4-t5) becomes higher than that in the example shown in FIG. 4.

After the time point t5 elapses, in order to cause the actual intake air temperature Tb to approach the target intake air temperature Tbt, the opening degree of the flow-rate-ratio control valve 52 is adjusted so as to increase the cooler passing-through flow rate ratio. As a result, the actual intake air temperature Tb converges to the target intake air temperature Tbt.

2-1-2. Processing of ECU Concerning Intake Air Temperature Control

Figure 7:
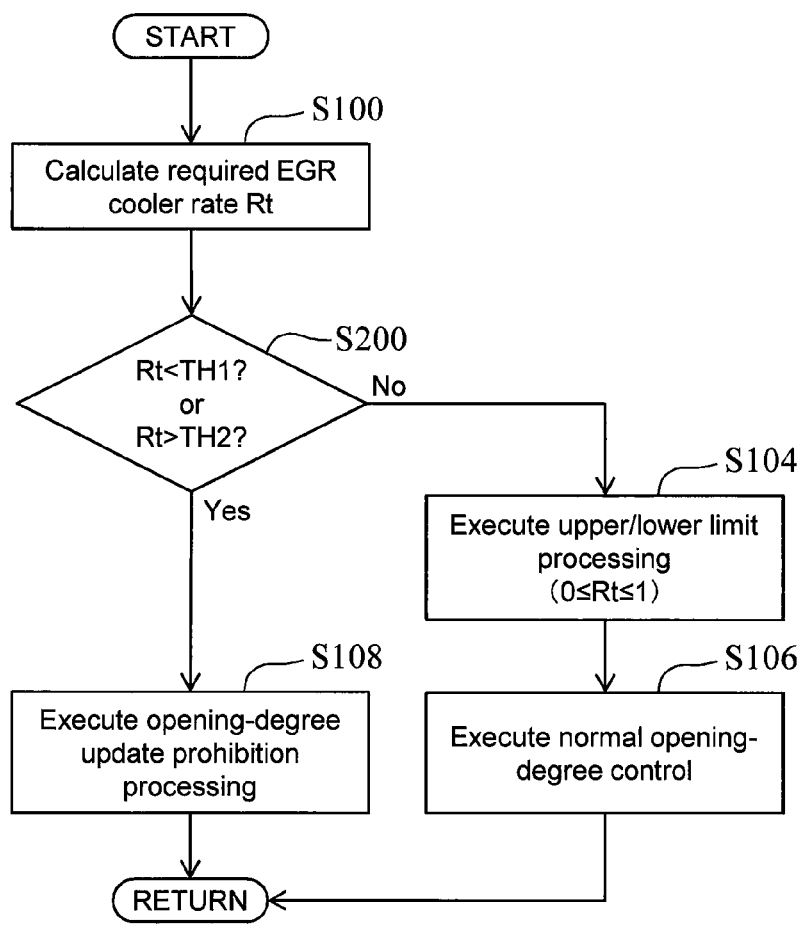
FIG. 7 is a flow chart that illustrates a routine of the processing concerning the intake air temperature control according to the second embodiment of the present disclosure.

FIG. 7 is a flow chart that illustrates a routine of the processing concerning the intake air temperature control according to the second embodiment of the present disclosure. The processing of steps S100, and S104 to S108 of the routine shown in FIG. 7 is as already described for the first embodiment.

According to the routine shown in FIG. 7, the ECU 60 proceeds to step S200 after calculating the required EGR cooler ratio Rt in step S100. In step S200, the ECU 60 determines whether or not any one of the following two requirements is met. One of the requirements is that the required EGR cooler ratio Rt is lower than the threshold value TH1 (for example, 0). The other requirement is that the required EGR cooler ratio Rt is higher than the threshold value TH2 (for example, 1).

As a result, if the determination result of step S200 is negative (TH1≤Rt≤TH2), the ECU 60 executes the processing of steps S104 and S106. It should be noted that, in the example in which the threshold value TH1 is 0 and the threshold value TH2 is 1, if the determination result of step S200 is negative, the value of the required EGR cooler ratio Rt falls within a range that is equal to or greater than 0 and equal to or less than 1. Thus, in this example, the processing of step S104 may alternatively be omitted.

If, on the other hand, the determination result of step S200 is positive (Rt<TH1, or Rt>TH2), the ECU 60 proceeds to step S108 to execute the opening-degree update prohibition processing.

2-1-3. Advantageous Effects Concerning Intake Air Temperature Control

As described so far, according to the intake air temperature control of the present embodiment, the opening-degree update prohibition processing is executed not only when the required EGR cooler ratio Rt is lower than the threshold value TH1 (=0) but also when the required EGR cooler ratio Rt is higher than threshold value TH2 (=1). As a result, the flow-rate-ratio control valve 52 stops being driven not only at the time of shortage of the EGR gas but also when, even if the adjustment of the opening degree of the flow-rate-ratio control valve 52 is performed, the target intake air temperature Tbt cannot be satisfied due to the EGR gas being excess. Since the frequency of moving the flow-rate-ratio control valve 52 becomes lower as a result, the progress of wear of a moving part of the flow-rate-ratio control valve 52 can be reduced more effectively.

2-2. Modification Example Concerning Second Embodiment

2-2-1. Other Example of Execution Condition of Opening-Degree Update Prohibition Processing In the second embodiment, an example in which the opening-degree update prohibition processing is executed not only when the the required EGR cooler ratio Rt is lower than the threshold value TH1 but also when the required EGR cooler ratio Rt is higher than threshold value TH2 has been described. However, the "opening-degree update prohibition processing" according to the present disclosure may alternatively be executed only when the required EGR cooler ratio Rt is higher than threshold value TH2, contrary to the example described above.

2-2-2. Other Example of Threshold value TH2

In the second embodiment described above, 1 is used as an example of the threshold value TH2. However, the threshold value TH2 is not limited to 1 as long as it is equal to or greater than 1, and may be an arbitrary value that is greater than 1. According to the relationship of formula (5) described above, what the value of the required EGR cooler ratio Rt becomes higher relative to 1 means that the target EGR gas temperature Tegrt is lower than the cooler passing-through gas temperature TegrC and the absolute value of the difference therebetween is greater. Because of this, the greater the value of the required EGR cooler ratio Rt is relative to 1, the greater the amount of increase of the actual intake air temperature Tb with respect to the target intake air temperature Tbt becomes when the opening degree of the flow-rate-ratio control valve 52 associated with the full cooling line (R=1) is selected. Accordingly, the threshold value TH2 may alternatively be made an arbitrary value that is greater than 1, and the opening-degree update prohibition processing may thus be executed only when it is supposed that the above-described amount of increase is greater than a certain level.

Third Embodiment

Next, a third embodiment according to the present disclosure will be described with reference to FIG. 8.

3. Intake Air Temperature Control According to Third Embodiment

The intake air temperature control according to the present embodiment is different from the intake air temperature control according to the first embodiment in terms of the contents of the "designated condition" that corresponds to the execution condition of the "opening-degree update prohibition processing".

In detail, according to the present embodiment, an estimation value TbeCBP of the intake air temperature Tb to be achieved if the flow-rate-ratio control valve 52 is controlled to cause the EGR cooler ratio R to be 0 is calculated. Also, it is determined that the "designated condition" is met when the absolute value of a temperature difference ΔTbeCBP between this estimation value TbeCBP and the target intake air temperature Tbt is greater than a threshold value TH3. It should be noted that the temperature difference ΔTbeCBP corresponds to an example of the temperature difference ΔTin corresponding to the "temperature difference" according to the present disclosure. In addition, the threshold value TH3 corresponds to an example of the "third threshold value" according to the present disclosure.

When, for example, the estimation value TbeCBP described above is calculated during the EGR gas shortage time period in the example of the operation shown in FIG. 4, the temperature difference ΔTbeCBP becomes greater than the threshold value TH3 due to the shortage of the EGR gas. As a result, the designated condition is met.

3-1. Processing of ECU Concerning Intake Air Temperature Control

Figure 8:
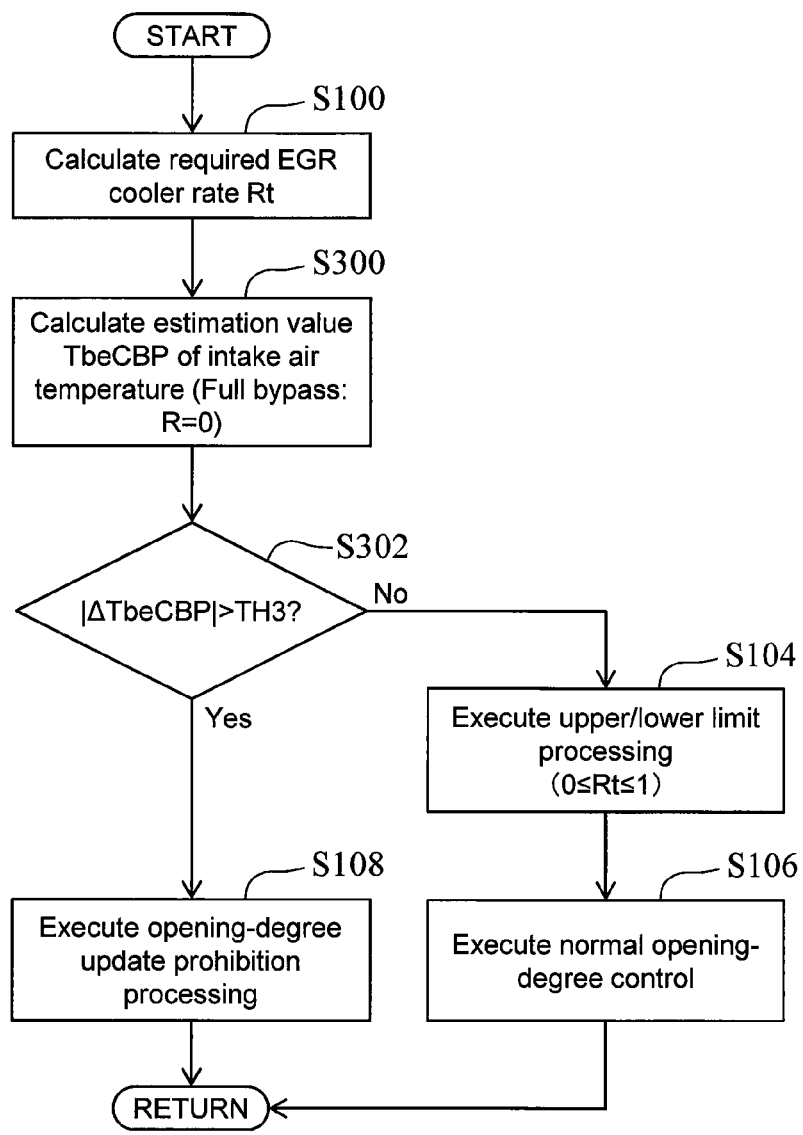
FIG. 8 is a flow chart that illustrates a routine of the processing concerning an intake air temperature control according to a third embodiment of the present disclosure.

FIG. 8 is a flow chart that illustrates a routine of the processing concerning the intake air temperature control according to the third embodiment of the present disclosure. The processing of steps S100, and S104 to S108 of the routine shown in FIG. 8 is as already described for the first embodiment.

According to the routine shown in FIG. 8, the ECU 60 proceeds to step S300 after calculating the required EGR cooler ratio Rt in step S100. In step S300, the ECU 60 calculates the estimation value TbeCBP described above (in other words, value to be achieved if the flow-rate-ratio control valve 52 is controlled to the opening degree associated with the full bypass line (see FIGS. 4 and 6)).

Calculation of the estimation value TbeCBP can be, for example, performed as follows. That is to say, firstly, the ECU 60 calculates an "estimation value Tegre of the EGR gas temperature" to be achieved if the flow-rate-ratio control valve 52 is controlled such that, in various temperature and flow rate conditions at the time point of execution of the processing of step S300, the opening degree associated with the full bypass line is achieved. This estimation value Tegre can be calculated, by performing the heat-release calculation described with reference to FIG. 3, as a value that is equal to the bypass passing-through gas temperature TegrCBP that is calculated when the required EGR cooler ratio Rt is made zero.

On that basis, by substituting the calculated estimation value Tegre of the EGR gas temperature into formula (6) described below, the estimation value TbeCBP of the intake air temperature can be calculated. It should be noted that, in the example of step S500, the value of the total EGR gas flow rate Gegr used for the calculation of the EGR ratio Regr (=Gegr/(Ga+Gegr)) is the same as the bypass passing-through gas flow rate GegrCBP.

$$TbeCBP=Regr \cdot Tegre+(1-Regr) \cdot Ta \qquad (6)$$

Next, the ECU 60 determines whether or not the absolute value of the temperature difference ΔTbeCBP between the calculated estimation value TbeCBP and the target intake air temperature Tbt is greater than the threshold value TH3 (step S302). It should be noted that the target intake air temperature Tbt can be calculated by the use of, for example, the method described with reference to FIG. 3.

If the determination result of step S302 is negative (absolute value of temperature difference ΔTbeCBP≤threshold value TH3), the ECU 60 executes the processing of steps S104 and S106. In other words, if the result is negative, the opening-degree update prohibition processing is not executed.

If, on the other hand, the determination result of step S302 is positive (absolute value of temperature difference ΔTbeCBP>threshold value TH3), that is, if it can be judged that the "designated condition" described above is met, the ECU 60 proceeds to step S108 to execute the opening-degree update prohibition processing.

3-2. Advantageous Effects Concerning Intake Air Temperature Control

According to the intake air temperature control of the present embodiment described so far, the opening-degree update prohibition processing is also executed when the "designated condition" is met. Therefore, similarly to the first embodiment, the progress of wear of a moving part of the flow-rate-ratio control valve 52 can be reduced.

Fourth Embodiment

Next, a fourth embodiment according to the present disclosure will be described with reference to FIG. 9.

4-1. Intake Air Temperature Control According to Fourth Embodiment

The intake air temperature control according to the present embodiment is different from the intake air temperature control according to the third embodiment in terms of the contents of the "designated condition" that corresponds to the execution condition of the "opening-degree update prohibition processing".

In detail, according to the present embodiment, in addition to the calculation of the estimation value TbeCBP described in the third embodiment, a temperature difference ΔTbeC between the target intake air temperature Tbt and the estimation value TbeC of the intake air temperature Tb to be achieved if the flow-rate-ratio control valve 52 is controlled such that the EGR cooler ratio R becomes 1 is also calculated. This temperature difference ΔTbeC also corresponds to another example of the "temperature difference" (temperature difference ΔTin) according to the present disclosure.

On that basis, according to the present embodiment, it is determined that, when the absolute value of the temperature difference ΔTbeCBP is greater than the threshold value TH3, or when the absolute value of the temperature difference ΔTbeC is greater than the threshold value TH3, the "designated condition" is met.

Additionally, with regard to the temperature difference ΔTbeC, when, for example, the estimation value Tbec described above is calculated during the time period (t4-t5) in the EGR gas excess time period in the example of the operation shown in FIG. 6, the temperature difference ΔTbeC becomes greater than the threshold value TH3 due to the EGR gas being excess. As a result, the designated condition is met.

4-1-1. Processing of ECU Concerning Intake Air Temperature Control

Figure 9:
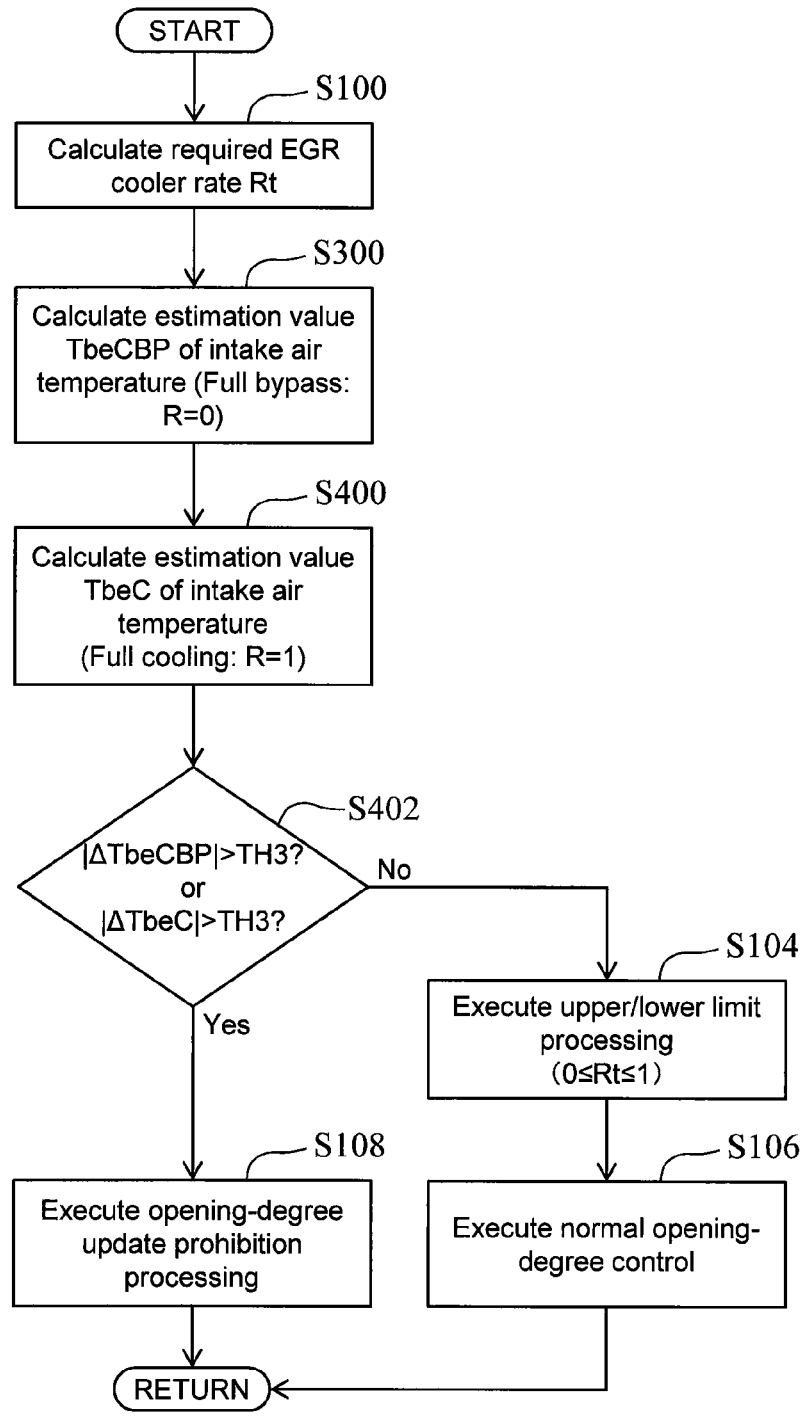
FIG. 9 is a flow chart that illustrates a routine of the processing concerning an intake air temperature control according to a fourth embodiment of the present disclosure.

FIG. 9 is a flow chart that illustrates a routine of the processing concerning the intake air temperature control according to the fourth embodiment of the present disclosure. The processing of steps S100, S104 to S108, and S300 of the routine shown in FIG. 9 is as already described for the first and third embodiments.

According to the routine shown in FIG. 9, the ECU 60 proceeds to step S400 after calculating the estimation value TbeCBP of the intake air temperature Tb in step S300. In step S400, the ECU 60 calculates the estimation value TbeC described above (that is, estimation value to be achieved if the flow-rate-ratio control valve 52 is controlled such that the opening degree associated with the full cooling line (see FIG. 6) is achieved). The estimation value TbeC can be calculated by the use of a method similar to that for the estimation value TbeCBP.

Next, the ECU 60 determines whether or not any one of the absolute value of the temperature difference ΔTbeCBP between the estimation value TbeCBP and the target intake air temperature Tbt and the absolute value of the temperature difference ΔTbeC between the estimation value TbeC and the target intake air temperature Tbt is greater than the threshold value TH3 (step S402). As a result, the ECU 60 proceeds to step S104 when the determination result of step S402 is negative, and, on the other hand, it proceeds to step S108 when the determination result of step S402 is positive.

4-1-2. Advantageous Effects Concerning Intake Air Temperature Control

According to the intake air temperature control of the present embodiment described so far, since the frequency of moving the flow-rate-ratio control valve 52 becomes lower as compared to the intake air temperature control according to the third embodiment, the progress of wear of a moving part of the flow-rate-ratio control valve 52 can be reduced more effectively.

4-2. Modification example Concerning Fourth Embodiment

In the fourth embodiment, an example in which the opening-degree update prohibition processing is executed not only when the absolute value of the temperature difference ΔTbeCBP is greater than the threshold value TH3 but also when the absolute value of the temperature difference ΔTbeC is greater than the threshold value TH3 has been described. However, the "opening-degree update prohibition processing" according to the present disclosure may alternatively be executed only when the absolute value of the temperature difference ΔTbeC is greater than the threshold value TH3, contrary to the example described above.

Fifth Embodiment

Next, a fifth embodiment according to the present disclosure and a modification example thereof will be described with reference to FIGS. 10 and 11.

5-1. Intake Air Temperature Control According to Fifth Embodiment

The intake air temperature control according to the present embodiment is different from the intake air temperature control according to the third embodiment in terms of the following additional temperature control processing being executed in addition to the execution the opening-degree update prohibition processing during the designated condition being met.

In detail, according to the additional temperature control processing mentioned above, the water-cooled intercooler device 24 is used and controlled so as to increase or decrease the "temperature of intake air" that flows through the intake air passage 18 at the downstream side of the intercooler 24a (immediately after the intercooler 24a). In the example shown in FIG. 1, since the intercooler 24a is arranged upstream of the EGR gas introduction port 44a, the fresh air temperature Ta corresponds to the "temperature of intake air" mentioned here.

The additional temperature control processing according to the present embodiment is executed as follows by controlling the flow rate of the refrigerant that flows through the intercooler 24a, as an example. In other words, if the required EGR cooler ratio Rt is lower than 0, that is, if the designated condition is met while the temperature difference ΔTin described above has a "negative value", the water pump 28 is controlled so as to decrease the flow rate of the refrigerant. If, on the other hand, the required EGR cooler ratio Rt is higher than 1, that is, if the designated condition is met while the temperature difference ΔTin described above has a "positive value", the water pump 28 is controlled so as to increase the flow rate of the refrigerant.

5-1-1. Processing of ECU Concerning Intake Air Temperature Control Accompanied by Additional Temperature Control Processing FIG. 10 is a flow chart that illustrates a routine of the processing concerning the intake air temperature control according to the fifth embodiment of the present disclosure. The processing of steps S100, S104 to S108, and S200 of the routine shown in FIG. 9 is as already described for the first and second embodiments.

Figure 10:
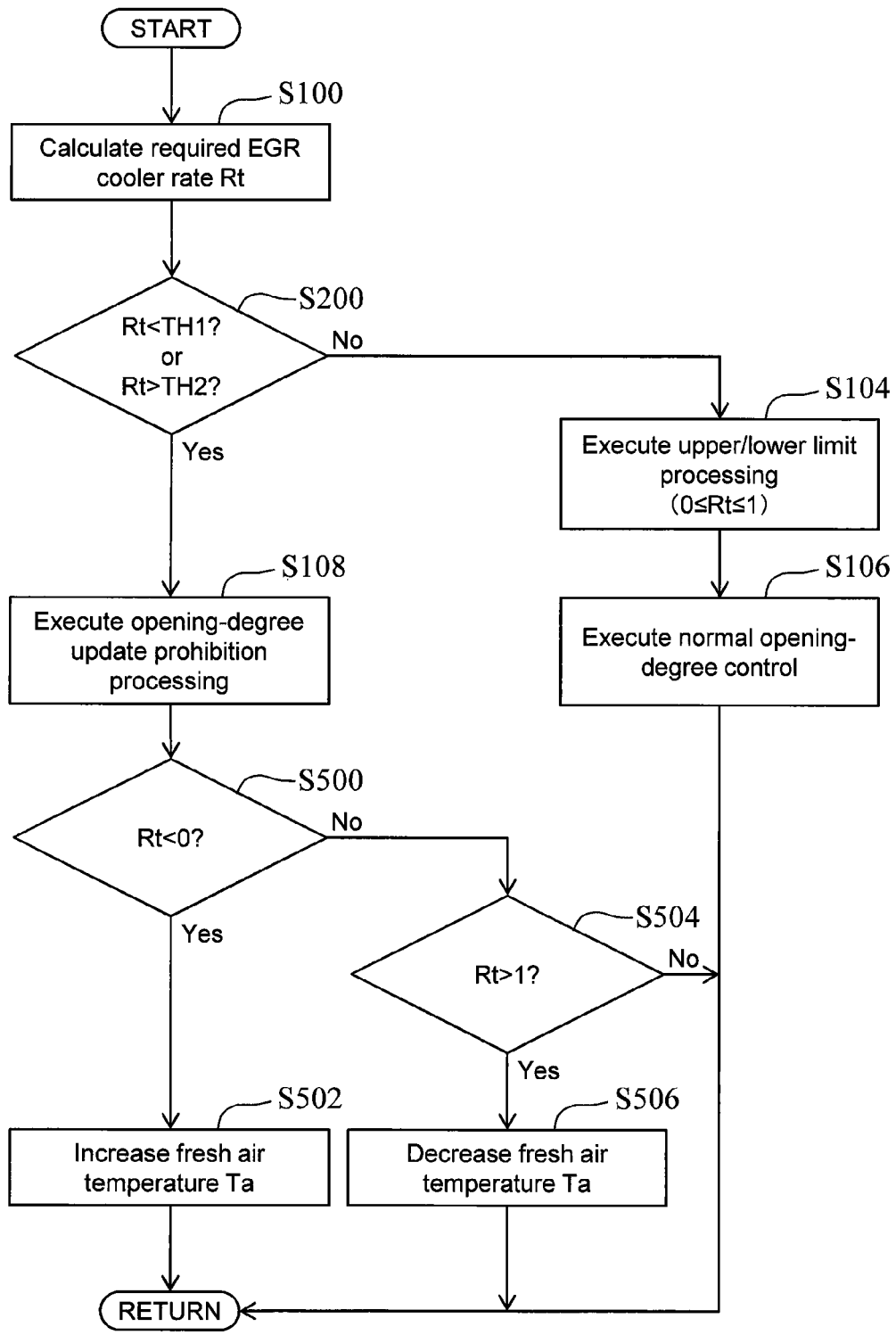
FIG. 10 is a flow chart that illustrates a routine of the processing concerning an intake air temperature control according to a fifth embodiment of the present disclosure.

According to the routine shown in FIG. 10, the ECU 60 executes the processing of steps S500 to S504 that corresponds to the additional temperature control processing after calculating the opening-degree update prohibition processing in step S108. Firstly, in step S500, the ECU 60 determines whether or not the required EGR cooler ratio Rt is lower than 0.

If the determination result of step S500 is positive (Rt<0), the ECU 60 proceeds to step S502. In step S502, the ECU 60 controls the water pump 28 such that the flow rate of the refrigerant of the intercooler 24a becomes less. As an example, the water pump 28 is controlled such that the flow rate of the refrigerant becomes less by a predetermined flow rate.

If, on the other hand, the determination result of step S500 is negative (Rt≥0), the ECU 60 proceeds to step S504. In step S504, the ECU 60 determines whether or not the required EGR cooler ratio Rt is greater than 1.

If the determination result of step S504 is positive (Rt>1), the ECU proceeds to step S506. In step S506, the ECU 60 controls the water pump 28 such that the flow rate of the refrigerant of the intercooler 24a becomes greater. As an example, the water pump 28 is controlled such that the flow rate of the refrigerant becomes greater by a predetermined flow rate.

If, on the other hand, the determination result of step S504 is negative (Rt≤0), the ECU 60 ends the current processing cycle. It should be noted that, in the example in which the threshold value TH1 is 0 and the threshold value TH2 is 1, if the determination result of step S200 is positive, the required EGR cooler ratio Rt becomes lower than 0 or greater than 1. Thus, in this example, the processing of step S504 may be omitted, and, if the determination result of step S500 is negative, the processing may proceed to step S506.

5-1-2. Advantageous Effects Concerning Intake Air Temperature Control Accompanied by Additional Temperature Control Processing As described so far, according to the intake air temperature control of the present embodiment, when the opening-degree update prohibition processing is executed, the additional temperature control processing is also executed. As a result, when the required EGR cooler ratio Rt is lower than 0, that is, when, even if the adjustment of the opening degree of the flow-rate-ratio control valve 52 is executed, the value of the actual intake air temperature Tb that reaches as a result of the adjustment of the opening degree is lower than the target intake air temperature Tbt, the fresh air temperature Ta can be increased owing to a decrease of the flow rate of the refrigerant. On the other hand, when the required EGR cooler ratio Rt is higher than 1, that is, when, even if the adjustment of the opening degree of the flow-rate-ratio control valve 52 is executed, the value of the actual intake air temperature Tb that reaches as a result of the adjustment of the opening degree is higher than the target intake air temperature Tbt, the fresh air temperature Ta can be decreased owing to an increase of the flow rate of the refrigerant.

When the adjustment of the intake air temperature Tb by the flow-rate-ratio control valve 52 is not executed for the execution of the opening-degree update prohibition processing (that is, for the reduction of the progress of wear of a moving part of the flow-rate-ratio control valve 52), the actual intake air temperature Tb can be caused to approach the target intake air temperature Tbt by the use of another means that increases or decreases, as needed, the fresh air temperature Ta by the additional temperature control processing described above.

5-2. Modification Example Concerning Fifth Embodiment

In the fifth embodiment, an example in which the additional temperature control processing is executed by the use of the control of the flow rate of the refrigerant for the intercooler device 24 has been described. However, the additional temperature control processing may alternatively be, for example, executed as follows, instead of the example of the flow rate of the refrigerant described above.

Figure 11:
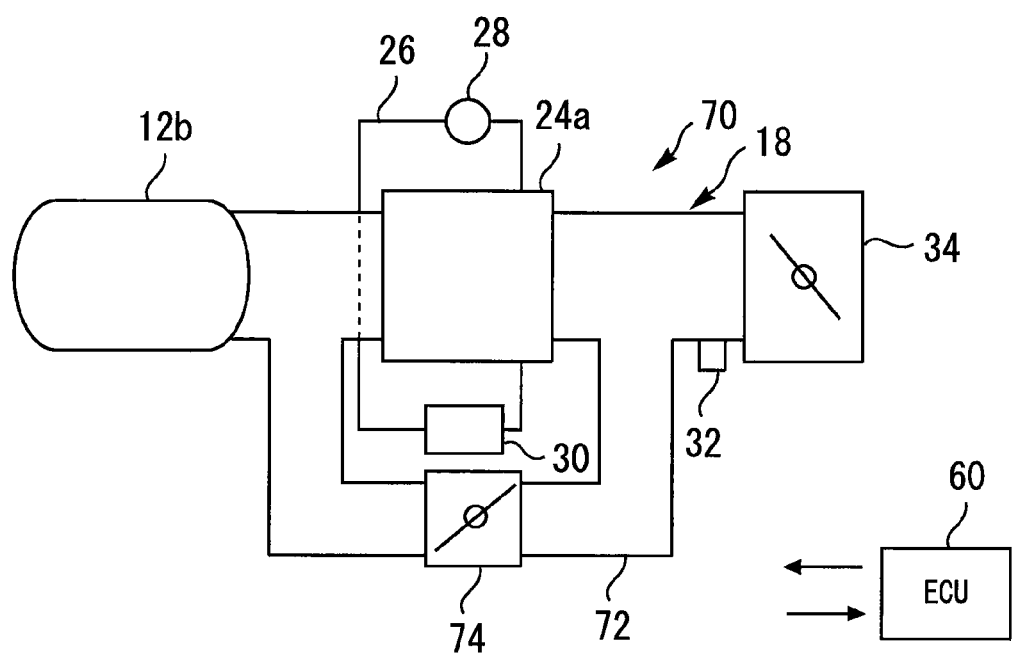
FIG. 11 is a schematic diagram for describing another example of the configuration of an intercooler device according to the present disclosure.

FIG. 11 is a schematic diagram for describing another example of the configuration of the intercooler device according to the present disclosure. It is supposed that an intercooler device 70 having a configuration shown in FIG. 11 is configured similarly to the intercooler device 24 shown in FIG. 1 except for the points described below.

As shown in FIG. 11, the intercooler device 70 is provided with an intercooler bypass passage 72 and a flow passage switching valve 74. The intercooler bypass passage 72 is connected to the intake air passage 18 and bypasses the intercooler 24a. In more detail, the intercooler bypass passage 72, for example, connects between a portion of the intake air passage 18 located between the compressor 12b and the intercooler 24a, and a portion of the intake air passage 18 located between the intercooler 24a and the throttle valve 34.

The flow passage switching valve 74 is arranged in the intercooler bypass passage 72. The flow passage switching valve 74 has a function that switches between a "cooler passing-through flow formation" in which the intake air flows through the intercooler 24a and a "cooler bypass flow formation" in which the intake air flows through the intercooler bypass passage 72. To achieve this, the flow passage switching valve 74 is, as an example, configured so as to open and close the intercooler bypass passage 72. The flow passage switching valve 74 is electrically connected to the ECU 60.

If the flow passage switching valve 74 is closed, the intake air that has passed through the compressor 12b is taken into each cylinder through the intercooler 24a. That is to say, the "cooler passing-through flow formation" is achieved. If, on the other hand, the flow passage switching valve 74 is opened, the intake air that has passed through the compressor 12b is taken into each cylinder through the intercooler bypass passage 72. That is to say, the "cooler bypass flow formation" is achieved.

If the determination result of step S500 (see FIG. 10) becomes positive under the cooler passing-through flow formation being selected, the flow passage switching valve 74 may alternatively be controlled so as to select the cooler bypass flow formation, as another example of the additional temperature control processing. The fresh air temperature Ta (which is an example of the "temperature of intake air" described above) can therefore be increased.

Moreover, if the determination result of step S504 (see FIG. 10) becomes positive under the cooler bypass flow formation being selected, the flow passage switching valve 74 may alternatively be controlled so as to select the cooler passing-through flow formation, as still another example of the additional temperature control processing. The fresh air temperature Ta (which is an example of the "temperature of intake air" described above) can therefore be decreased.

Furthermore, if the intercooler device 70 includes a flow passage switching valve capable of selecting arbitrary intermediate opening degrees, the additional temperature control processing may alternatively be executed, for example, as follows. Specifically, if the determination result of step S500 becomes positive, the flow passage switching valve may alternatively be controlled so as to decrease the proportion of the flow rate of the fresh air flowing through the intercooler 24a. In addition, if the determination result of step S504 becomes positive, the flow passage switching valve may alternatively be controlled so as to increase the proportion of the flow rate of the fresh air flowing through the intercooler 24a.

It should be noted that the additional temperature control processing described in the fifth embodiment or the modification example thereof may alternatively be combined with the intake air temperature control according to any one of other first, second and fourth embodiments, instead of the intake air temperature control according to the third embodiment.

Other Embodiments 6-1. Other Example of Internal Combustion Engine

In the first to fifth embodiments described above, the internal combustion engine 10 that is a supercharged engine has been exemplified. However, even in a naturally-aspirated engine that does not include a supercharger, a response delay (shortage or excess) of the EGR gas may occur when the engine operating condition transitionally changes (for example, at the time of acceleration). Thus, the "intake air temperature control" according to the present disclosure may alternatively be applied to a naturally-aspirated engine, instead of a supercharged engine.

6-2. Other Example of EGR Device

In the first to fifth embodiments described above, the EGR device 42 of the HPL type has been exemplified. However, the "EGR device" applied to the present disclosure may not always be of the HPL type, and may be of a low pressure loop (LPL) type which uses an EGR passage that connects a portion of an intake air passage located on the upstream side of a compressor with a portion of an exhaust gas passage located on the downstream side of a turbine, and, alternatively, be of a general type used in a naturally-aspirated engine.

The embodiments and modifications described above may be combined in other ways than those explicitly described above as required and may be modified in various ways without departing from the scope of the present disclosure.

What is claimed is:
1. A control device for an internal combustion engine, the internal combustion engine including an EGR device that includes:
an EGR passage configured to connect an intake air passage of the internal combustion engine with an exhaust gas passage thereof;
an EGR cooler arranged at the EGR passage;
an EGR cooler bypass passage configured to be connected with the EGR passage and bypass the EGR cooler; and
a flow-rate-ratio control valve capable of controlling, by adjustment of an opening degree of the flow-rate-ratio control valve, an EGR cooler ratio R that is a flow rate ratio of a flow rate of EGR gas flowing through the EGR cooler with respect to a total flow rate of EGR gas flowing through the EGR passage and the EGR cooler bypass passage,
wherein the control device is configured, during execution of an EGR gas introduction operation that introduces EGR gas into the intake air passage, to execute an intake air temperature control for adjusting the opening degree of the flow-rate-ratio control valve such that an intake air temperature Tb that is a temperature of a gas suctioned into a cylinder of the internal combustion engine approaches a target intake air temperature Tbt, and wherein, in the intake air temperature control, the control device is configured, when a designated condition is met, to execute an opening-degree update prohibition processing that prohibits an update of the opening degree of the flow-rate-ratio control valve the designated condition being a condition that, even if the adjustment of the opening degree of the flow-rate-ratio control valve is performed, there is a temperature difference obtained by subtracting the target intake air temperature Tbt from a value of the intake air temperature Tb, and wherein the temperature difference occurs as a result of the adjustment of the opening degree.

2. The control device according to claim 1,
wherein the control device is configured to:
calculate, in accordance with formula (1), a required EGR cooler ratio Rt that is a required value of the EGR cooler ratio R required to cause the intake air temperature Th to approach the target intake air temperature Tbt;
calculate, in accordance with formula (2), a target EGR gas temperature Tegrt in the formula (1) that is a target value of a temperature Tegr of the EGR gas introduced into the intake air passage; and
determine that, when the required EGR cooler ratio Rt is lower than a first threshold value that is equal to or lower than 0 or when the required EGR cooler ratio Rt is higher than a second threshold value that is equal to or higher than 1, the designated condition is met, $$Tegrt = Rt \cdot TegrC + (1-Rt)TegrCBP \qquad (1)$$

$$Tbt = Re\,gr \cdot Tegrt + (1 - Regr) \cdot Ta \qquad (2)$$

Where, in formula (1), TegrC denotes a temperature of EGR gas passing through the EGR cooler and TegrCBP denotes a temperature of EGR gas passing through the EGR cooler bypass passage, and, in formula (2), Regr denotes an EGR ratio and Ta denotes a temperature of fresh air at a portion of the intake air passage located on an upstream side of an EGR gas introduction port for the intake air passage.

3. The control device according to claim 1,
wherein the temperature difference corresponds to a difference between the target intake air temperature Tbt and an estimation value of the intake air temperature Tb to be achieved if the flow-rate-ratio control valve is controlled such that the EGR cooler ratio R becomes 0 or 1, and
wherein the control device is configured, when an absolute value of the temperature difference is greater than a third threshold value, to determine that the designated condition is met.

4. The control device according to claim 1,
wherein the internal combustion engine includes:
a supercharger configured to supercharge intake air; and
a water-cooled intercooler device that includes an intercooler installed in a portion of the intake air passage located on a downstream side of a compressor of the supercharger and is configured to cool the intake air,
wherein the control device is configured, when the designated condition is met while the temperature difference is a negative value, to control the intercooler device such that a temperature of intake air flowing through a portion of the intake air passage located on a downstream side of the intercooler increases.

5. The control device according to claim 1,
wherein the internal combustion engine includes:
a supercharger configured to supercharge intake air; and
a water-cooled intercooler device that includes an intercooler installed in a portion of the intake air passage located on a downstream side of a compressor of the supercharger and is configured to cool the intake air,
wherein the control device is configured, when the designated condition is met while the temperature difference is a positive value, to control the intercooler device such that a temperature of intake air flowing through a portion of the intake air passage located on a downstream side of the intercooler decreases.

6. A control device for an internal combustion engine,
the internal combustion engine including an EGR device that includes:
an EGR passage configured to connect an intake air passage of the internal combustion engine with an exhaust gas passage thereof;
an EGR cooler arranged at the EGR passage;
an EGR cooler bypass passage configured to be connected with the EGR passage and bypass the EGR cooler; and
a flow-rate-ratio control valve capable of controlling, by adjustment of an opening degree of the flow-rate-ratio control valve, an EGR cooler ratio R that is a flow rate ratio of a flow rate of EGR gas flowing through the EGR cooler with respect to a total flow rate of EGR gas flowing through the EGR passage and the EGR cooler bypass passage,
wherein the control device is configured, during execution of an EGR gas introduction operation that introduces EGR gas into the intake air passage, to execute an intake air temperature control for adjusting the opening degree of the flow-rate-ratio control valve such that an intake air temperature Tb that is a temperature of a gas suctioned into a cylinder of the internal combustion engine approaches a target intake air temperature Tbt, and wherein, in the intake air temperature control, the control device is configured, when a designated condition is met, to execute an opening-degree update prohibition processing that prohibits an update of the opening degree of the flow-rate-ratio control valve, the designated condition being a condition that, when the adjustment of the opening degree of the flow-rate-ratio control valve is performed, there is a temperature difference obtained by subtracting the target intake air temperature Tbt from a value of the intake air temperature Tb, and wherein the temperature difference is obtained after the adjustment of the opening degree.

* * * * *